(12) United States Patent
Olmstead et al.

(10) Patent No.: US 8,269,868 B2
(45) Date of Patent: Sep. 18, 2012

(54) SYSTEMS AND METHODS FOR IMAGING

(75) Inventors: Bryan L. Olmstead, Eugene, OR (US);
WenLiang Gao, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 458 days.

(21) Appl. No.: 12/642,499

(22) Filed: Dec. 18, 2009

(65) Prior Publication Data

US 2010/0165160 A1 Jul. 1, 2010

Related U.S. Application Data

(60) Provisional application No. 61/145,729, filed on Jan. 19, 2009, provisional application No. 61/140,930, filed on Dec. 26, 2008.

(51) Int. Cl.
*H04N 3/14* (2006.01)
*G03B 9/70* (2006.01)
*G03B 15/03* (2006.01)

(52) U.S. Cl. .................. 348/296; 396/180; 396/190

(58) Field of Classification Search ............... 348/296; 396/80, 90
See application file for complete search history.

(56) References Cited

U.S. PATENT DOCUMENTS

| | | | |
|---|---|---|---|
| 5,646,390 A | 7/1997 | Wang et al. | |
| 6,061,091 A | 5/2000 | Van de Poel et al. | |
| 6,295,077 B1 | 9/2001 | Suzuki | |
| 7,128,266 B2 | 10/2006 | Zhu et al. | |
| 7,129,983 B2 * | 10/2006 | Rantanen et al. | 348/371 |
| 7,188,770 B2 | 3/2007 | Zhu et al. | |
| 7,213,762 B2 | 5/2007 | Zhu et al. | |
| 7,223,956 B2 * | 5/2007 | Yoshida | 250/208.1 |
| 7,273,180 B2 | 9/2007 | Zhu et al. | |
| 2006/0202036 A1 | 9/2006 | Wang et al. | |
| 2010/0026853 A1 * | 2/2010 | Mokhnatyuk | 348/240.2 |

FOREIGN PATENT DOCUMENTS

JP 2007-521575 A 8/2007

OTHER PUBLICATIONS

"Enhanced Laser Shutter Using a Hard Disk Drive Rotary Voice-Coil Actuator," http://scitation.aip.org/getabs/servelt/GetabsServlet?prog=normal&id=RSINAK00..., published Feb. 9, 2007.
"Enhanced laser shutter using a hard disk drive rotary voice-coil actuator," 78 *Rev. Sci. Instrum.* 026101, Feb. 9, 2007.
International Search Report and Written Opinion, PCT/US/2009/068680, Aug. 17, 2010.

\* cited by examiner

*Primary Examiner* — Jason Chan
*Assistant Examiner* — Joel Fosselman
(74) *Attorney, Agent, or Firm* — Stoel Rives LLP

(57) ABSTRACT

A data reader preferably includes an imaging device that operates on a rolling reset basis to capture images of a moving target. Images of moving targets are preferably analyzed to determine the ambient light intensity, and a processor in the data reader preferably adjusts operation of the imager and of a light source based on the intensity of the ambient light. Other data readers may use an imager with a mechanical shutter that is designed for rapid, frequent operation.

22 Claims, 15 Drawing Sheets

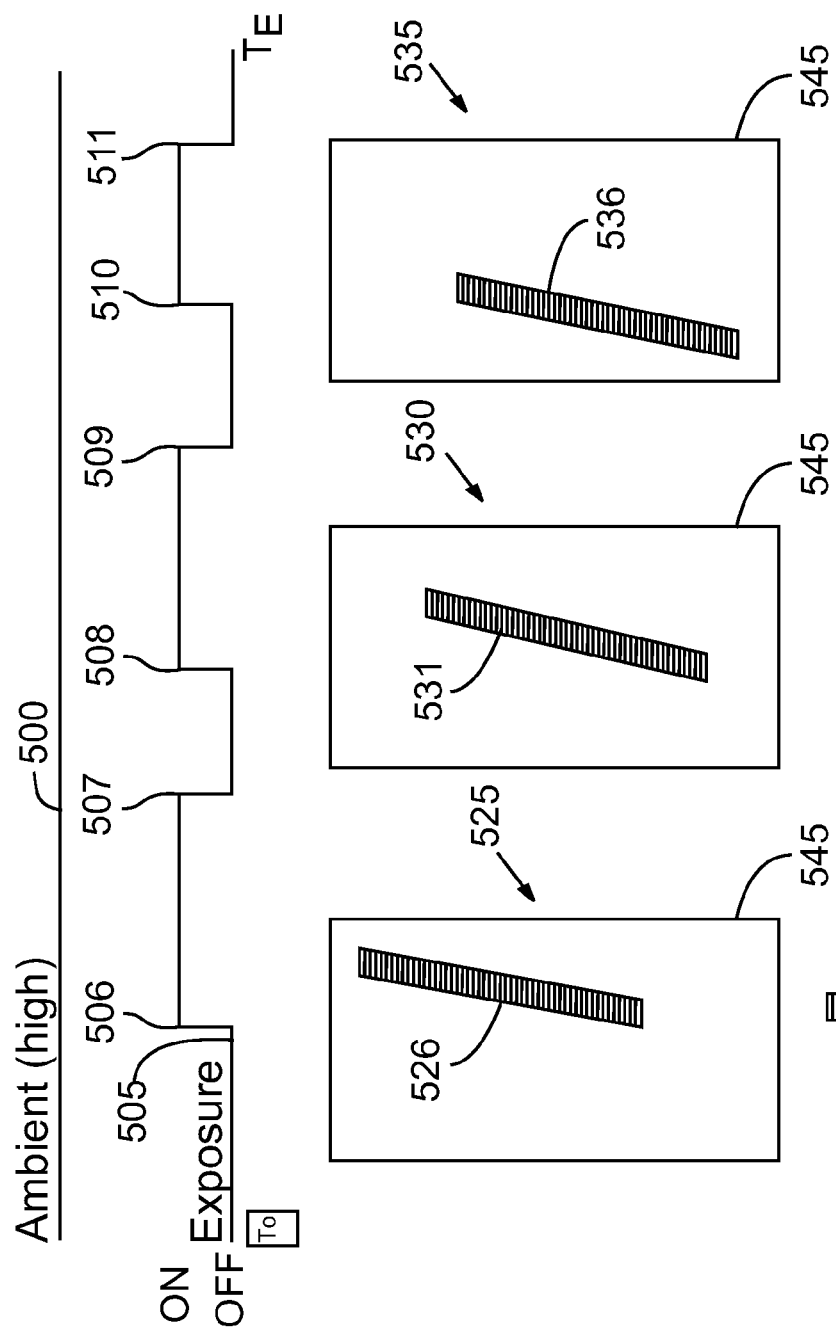

SYSTEMS AND METHODS FOR IMAGING

RELATED APPLICATIONS

This application claims priority under 35 U.S.C. §119(e) to U.S. Provisional Application No. 61/145,729 titled "Systems and Methods for Imaging" filed on Jan. 19, 2009 and to U.S. Provisional Application No. 61/140,930 titled "Optical Code Reader Having Compact Arrangement for Acquisition of Multiple Views of an Object" filed on Dec. 26, 2008, both of which are fully incorporated herein by reference.

BACKGROUND

The field of the present invention relates to data capturing and decoding systems and devices that use imagers.

Solid-state imagers used in data readers, such as hand held and fixed mounted optical code readers (such as barcode readers), may be used to acquire images of moving targets, that is, where the target moves in relation to the imager or the imager moves in relation to the target. Typical solid-state imagers contain an array, typically a two dimensional grid, of electrically coupled light sensitive photodiodes referred to as pixels that convert incident light energy into packets of electric charge. Current solid-state imagers used to capture images of moving targets are generally based on one of the following technologies: (1) charge-coupled device (CCD), (2) complementary metal oxide semiconductor (CMOS) imager with global shutter, or (3) CMOS imager with a mechanical shutter and global reset. The foregoing technologies are commonly used for gathering information from a moving target with a solid-state imager because each technology enables all of the imager's pixels to be exposed to light during the same time period to collect light energy and transform the light energy into an electrical charge. The foregoing technologies also permit all of the pixels to be exposed for a relatively short time that is sufficient to produce a stop-motion image of a moving target, in other words, an image with sharp features.

Because the specialized construction of CCDs is more complicated than the construction of CMOS imagers, and because CMOS imagers may be built in high volume wafer fabrication facilities used for related technologies such as microprocessors and chip sets, CMOS imagers cost less than CCDs. In addition to lower cost, the common fabrication processes used to create CMOS imagers permits a CMOS pixel array to be integrated on a single circuit with other electronic devices such as clock drivers, digital logic, analog/digital converters and other suitable electronics. The compact structures possible for a CMOS imager may also reduce space requirements and lower power consumption.

CMOS based imagers traditionally use rolling shutters to expose pixels in the sensor array. With a rolling shutter, rows of pixels are cleared, exposed, and read out in sequence. During integration, a row of pixels is exposed to light energy and each pixel builds an electric charge corresponding to the amount and wavelengths of light impinging the pixel. Because the rows are activated and read out in sequence, there is an elapsed time between when the first row integrates and when the last row integrates. Because of the elapsed time between when the first row begins to integrate and when the subsequent rows begin to integrate, a CMOS imager with a rolling shutter will likely capture an image of a moving target that is slanted as illustrated in FIG. 1A. The present inventors have realized that to capture images of high speed motion while avoiding motion blur with current CMOS imagers, a short exposure time is needed. Furthermore, the present inventors have realized that a very high intensity light source is required to provide sufficient illumination intensity on the pixels when a short exposure is used. Thus, the present inventors have realized that a CMOS with a short exposure and high intensity light source is not suited for applications near human operators or in battery powered applications.

A current CMOS imager with a rolling shutter used to capture an image of a moving target in relatively low light conditions will likely require relatively long integration times. Relatively long integration times may cause blurred images as illustrated in FIG. 2.

Current data readers using CMOS imagers may require either a global shutter or a mechanical shutter with a global reset to capture a non-slanted, non-blurry, high contrast image of a moving target. Global shutter imagers have a different pixel structure than rolling shutter imagers. In a global shutter imager, all pixels are exposed to light simultaneously during the exposure time. At the completion of the exposure time, the signal captured by each pixel is transferred to a storage area located within the pixel region (a capacitor). During readout, the stored signal is transferred. Since all pixels are exposed at the same time, a "snap" shot of a moving target can be captured. The light source need only be enabled during this short exposure time (much like the flash of a digital camera), making the required light intensity much lower than for a conventional rolling shutter system.

A mechanical shutter has substantially the same effect as a global shutter, but instead of being a part of the solid-state device, a mechanical shutter is a mechanical system that periodically permits light to impinge the rolling shutter CMOS imager. Thus, a rolling shutter CMOS imager with a mechanical shutter may start integrating the first row with the shutter closed, that is, blocking light from impinging the CMOS. The integration time for each row is long enough to permit all of the rows to be integrating during the same time period. After all of the rows are integrating, the mechanical shutter is opened for a short time to expose the pixels to light energy. The mechanical shutter is then closed. A global reset can be used in some rolling shutter CMOS imagers, which starts the exposure of all rows in the imager at the same time. The mechanical shutter is then open and shut and the rows are sequentially read out. Other rows of the image continue to expose until they are read out, but with the mechanical shutter closed, no additional light is integrated on these rows.

The present inventors have recognized that both a global shutter and a mechanical shutter with global reset add complexity and cost to CMOS imagers, thus bringing CMOS imagers closer in cost to CCD imagers. The present inventors have also recognized that mechanical shutters are typically used with a still camera, may only occasionally be operated, and that the complex moving parts tend to wear out and are not suited to high speed imaging, for example, imaging associated with a data reader such as an optical code reader which requires continuous activation of a mechanical shutter for extended periods of time.

The present inventors therefore recognized a need for an improved data reader using a rolling shutter CMOS imager to capture images of moving targets.

SUMMARY

The present invention is directed to systems and methods for data reading using image capturing devices. In a preferred configuration, a data reader includes an image sensor that is progressively exposed to capture an image on a rolling basis, such as a CMOS imager with a rolling shutter. The image sensor is used with a processor to detect and quantify ambient light intensity. Based on the intensity of the ambient light, the processor controls integration times for the rows of photodiodes of the CMOS. The processor also coordinates when a light source is pulsed based on the intensity of the ambient light and the integration times for the photodiode rows.

Additional aspects and advantages will be apparent from the following detailed description of preferred embodiments, which proceeds with reference to the accompanying drawings.

BRIEF DESCRIPTION OF THE DRAWINGS

FIG. 2A is an image of the target of FIG. 2 taken with a CMOS with a rolling shutter imager while the target is moving and there are light pulses to override the ambient light and be the major illumination source for the captured image.

FIG. 3A is an image of the target of FIG. 3 taken with a CMOS with a rolling shutter imager while the target is moving and there is a light pulse to override the ambient light and be the major illumination source for the captured image.

FIG. 6 is a schematic time sequence for capturing multiple images of a moving target.

FIG. 7 is an exemplary target.

DETAILED DESCRIPTION OF PREFERRED EMBODIMENTS

Preferred embodiments will now be described with reference to the drawings. The preferred embodiments will be described in terms of a data reader including a solid-state imager and configured to be a fixed, presentation, hand held, or other suitable data reader. Preferred embodiments may overcome the above noted problems associated with using CMOS imaging devices with electronic rolling shutters to capture images of moving targets, or may have other advantages.

Figure 4:
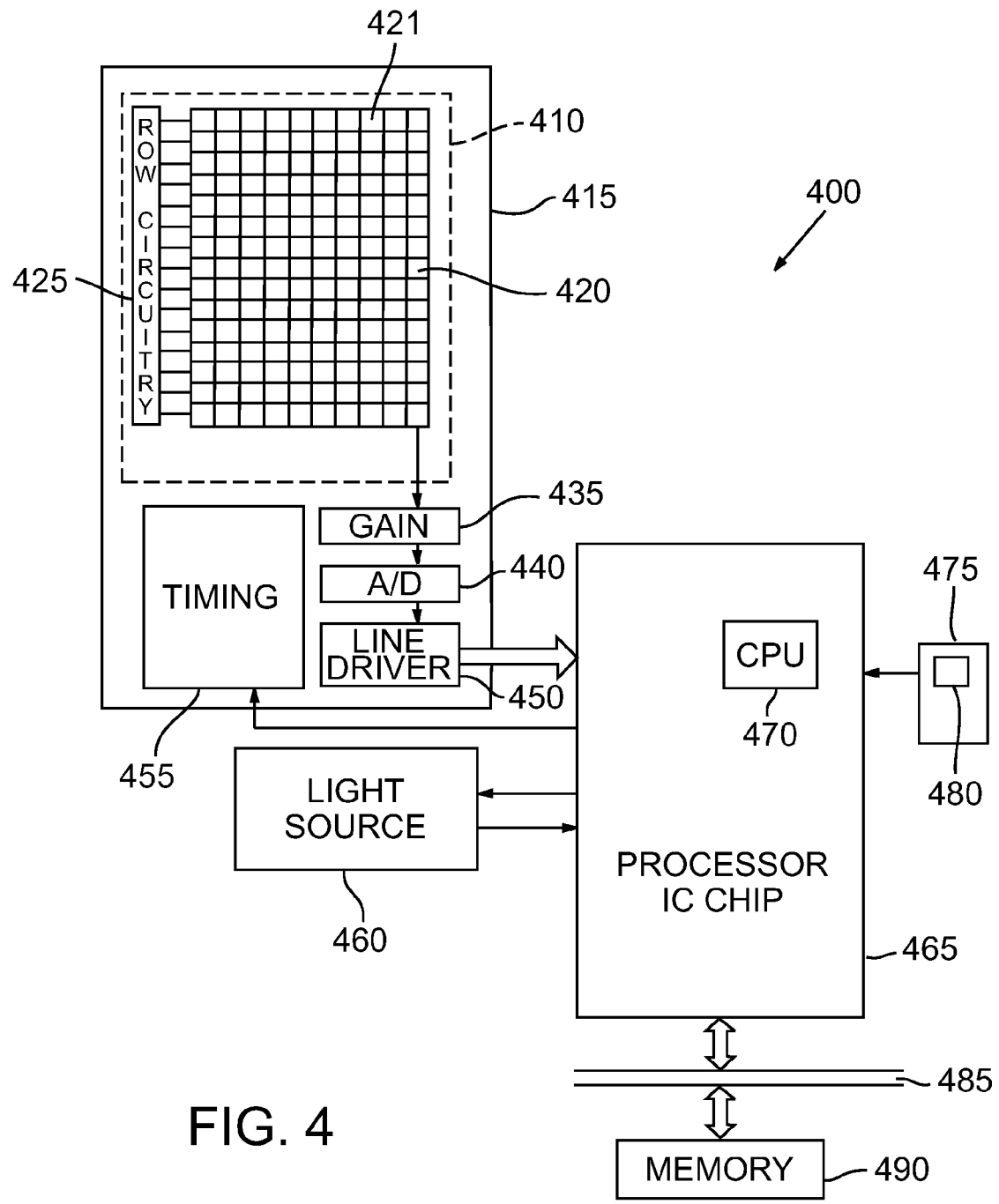
FIG. 4 is a schematic diagram for a data reader.

FIG. 4 schematically illustrates a solid state data reader 400 with a CMOS imager 410 and an electronic rolling reset circuit for a preferred embodiment.

An integrated circuit 415 may include a CMOS imager 410 having rows of pixels 420, and columns of pixels 421. The integrated circuit 415 may also include circuitry that operates with the CMOS imager 410 such as a gain 435 for generating a multi-bit signal indicative of light incident on each pixel, an analog-to-digital converter 440, and a line driver 450 to act as a buffer and provide driving power for the integrated circuit 415. Alternately, associated circuitry may be discrete from the integrated circuit 415.

An electronic rolling shutter circuit may include on-chip row circuitry 425 and a timing circuit 455 that are electrically connected to a processor integrated circuit 465. The timing circuit 455 may include components such as a bias circuit, a clock/timing generation circuit, and/or an oscillator. The processor integrated circuit 465 may include a central processing unit 470, or other suitable processor. The row circuitry 425 may enable one or more processing and/or operational tasks such as addressing rows of pixels 420, addressing columns of pixels 421, clearing the previous signal charge on rows of pixels 420, enabling exposure of pixels 420, decoding signals, amplifying signals, analog-to-digital signal conversion, applying timing, read out and reset signals and other suitable processes or tasks.

The data reader 400 may include a memory 490 connected to the processor integrated circuit 465 via a system bus 485, a light source 460 connected to the processor integrated circuit 465, and an actuator 475 including a trigger device 480 connected to the processor integrated circuit 465. The memory 490 may be a RAM, EPROM, flash memory, or other suitable device. When actuated, the trigger device 480 may generate a signal that initiates a light histogram creation process (described below) and/or a data capture and decode process. Alternatively, the histogram, data capture, and decoding processes may cycle continuously, as may be appropriate for a fixed mounted scanning device. The processor integrated circuit 465 may be programmed or otherwise configured to carry out various functions, including, but not limited to, data decoding and creating histograms of light levels (described below) and may operate in accordance with instructions provided by software stored in memory 490.

Illuminance Determination

Figure 1:
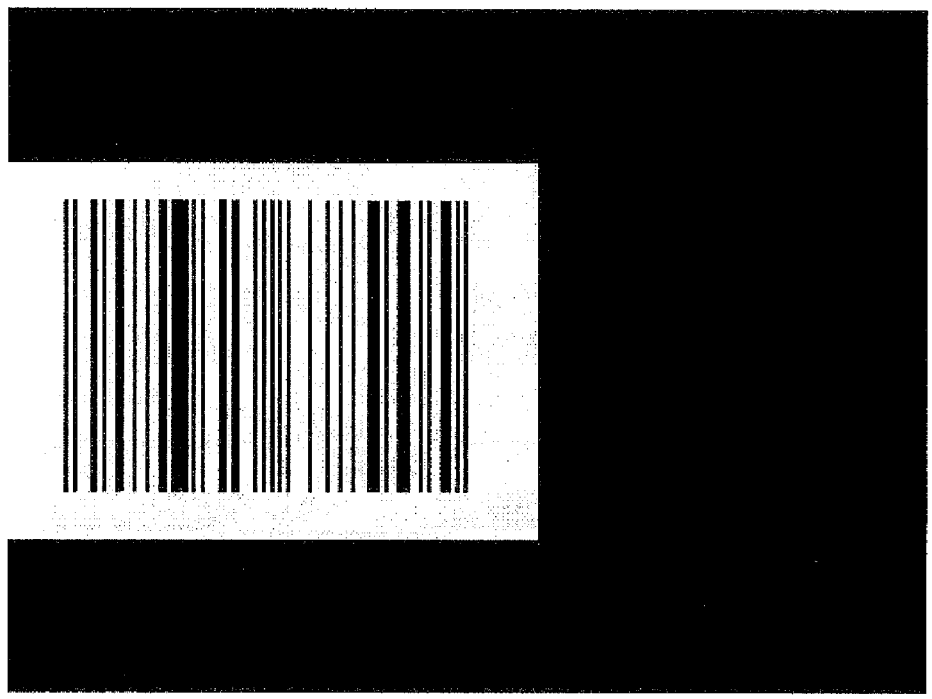
FIG. 1 is an image of a stationary target taken with a CMOS with a rolling shutter with relatively high ambient light.
Figure 1A:
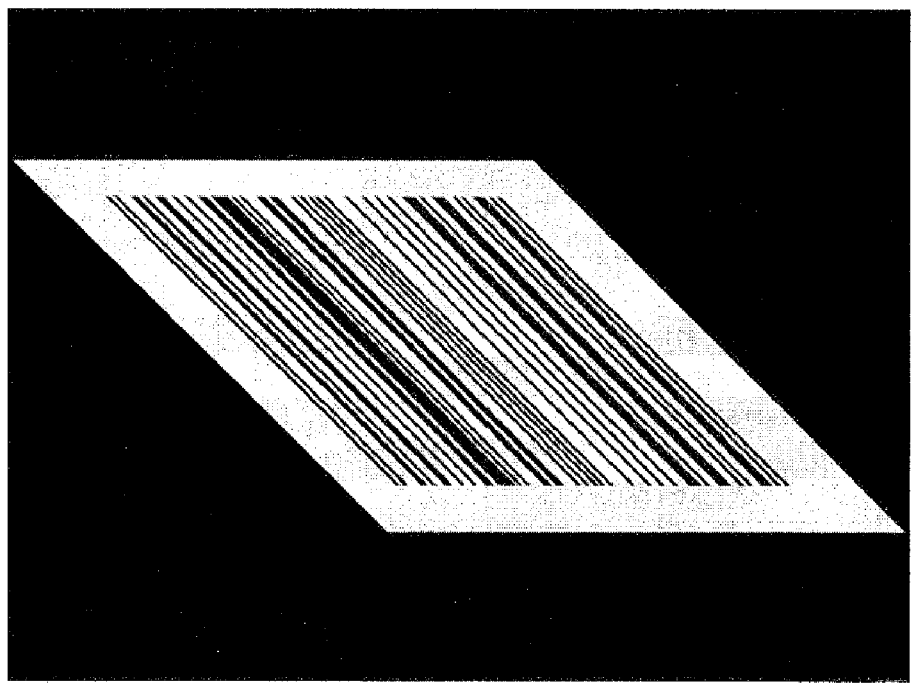
FIG. 1A is an image of the target of FIG. 1A taken with a CMOS with a rolling shutter imager with relatively high ambient light while the target is moving.

In a preferred configuration, depending on the amount of ambient light and the integration times, the light source may be pulsed one or more times per frame to create stop-motion images of a moving target where the stop-motion images are suitable for processing to decode data represented by the moving target. Under low ambient light conditions, for example, the processor directs the emission of a short pulse of self generated illumination (such as from one or more LEDs) which is preferably fired once per frame while the CMOS imager's pixels integrate for a full frame time, thereby causing each row to receive light from the LED pulse. In brighter ambient light conditions, the captured image preferably includes the stop-motion image from the LED pulse added to a blurred image from ambient light, since the imaged object moves a considerable distance during the long exposure time. Preferably, the intensity of the captured image from the pulsed illumination is brighter than the intensity of the blurred image captured from ambient light, thereby creating a captured image due to both pulsed illumination and ambient light. Brighter pulsed illumination when compared to the ambient light may create an image of sufficient quality to permit processing the image to decode information, such as barcodes. Under bright ambient light conditions, however, the processor may cause the rows to sequentially integrate with a relatively short integration time and without pulsing the light source. For example, if the ambient light intensity is sufficient to capture an image with decodable information a slanted image of a moving target may be captured due to the rolling integration nature of the CMOS imager (for example, as shown in FIG. 1A).

Figure 5:
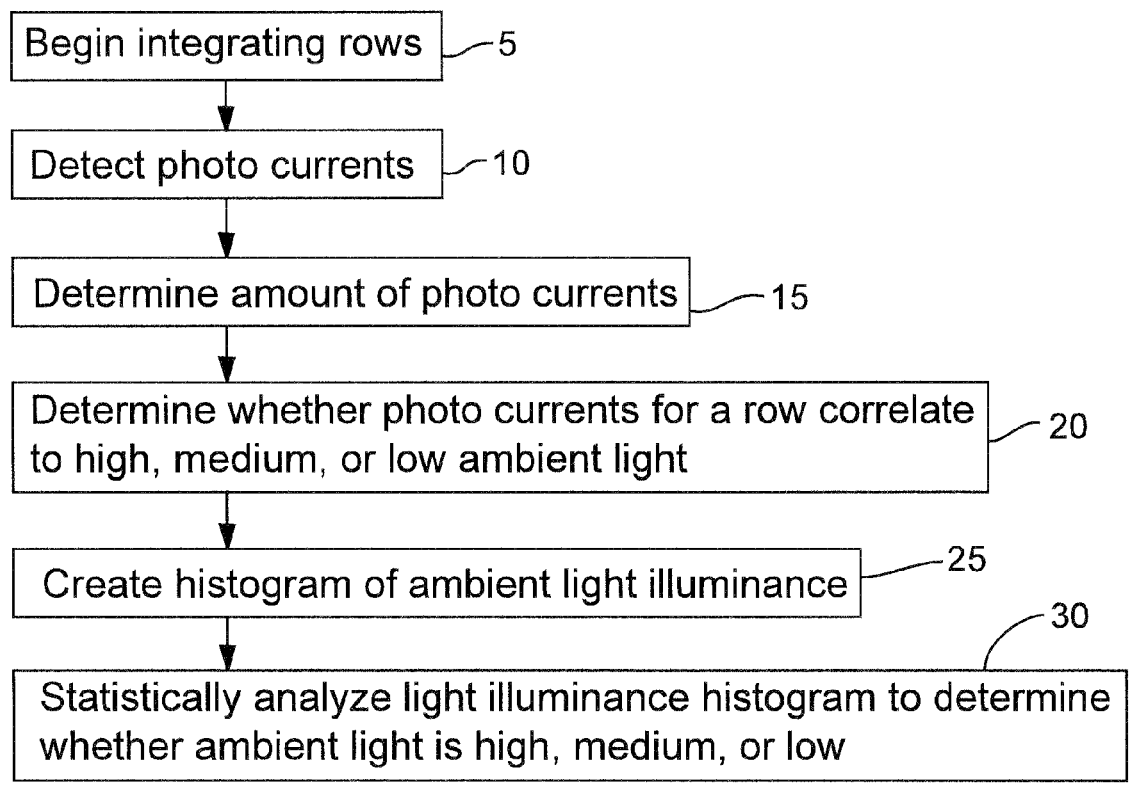
FIG. 5 is a flow chart for creating a light level histogram.

FIG. 5 illustrates a flowchart of a method for determining illuminance from ambient light using the CMOS imager 410. In one embodiment, ambient light is measured by disabling all self generated sources of illumination, such as pulsed LEDs. When the rows of pixels 420 begin integrating at step 5, light impinges on the pixels and a photocurrent is created. The processor integrated circuit 465 may detect the photocurrent associated with each pixel at step 10. Because the amount of photocurrent present correlates to the intensity of the light impinging each pixel, the processor integrated circuit 465 may determine the amount of photocurrent generated by a row 420 at step 15 and may determine the illuminance of the ambient light at step 20. For example, referring to FIGS. 6, 8, and 9, as the rows 420 integrate during the time periods 506 to 507, 731 to 706, and 811 to 805, there is no light impinging the pixels where the light originated from a light source associated with the data reader 400. Likewise, between times 707 and 708, 709 and 710, and 711 and 712, there is no light impinging the pixels where the light originated from a light source attached to the data reader 400. Therefore, photocurrents generated when a light source associated with the data reader 400 is off may be attributable as ambient light.

Alternative suitable manners for determining ambient light illuminance may be used. For example, when the illuminance emitting from a light source associated with the data reader 400 is known, photocurrents generated when the light source is on may be used to determine the ambient light illuminance. The illuminance attributable to the light source is subtracted from the total illuminance impinging the pixels when the light source is on to derive the ambient light illuminance.

Preferably, at step 25 the processor integrated circuit 465 creates a histogram of light illuminance based on the photocurrents detected at step 10. A histogram, for example, may categorize light illuminance into several fields, such as high, medium, and low. More or fewer fields may be used for the categorization, for example, high, low-high, high-medium, medium, low-medium, high-low, and low, or other suitable fields may be used. In a preferred embodiment, a MT9M001 ½ inch megapixel CMOS digital image sensor made by Aptina Imaging of San Jose, Calif., may be used to detect illuminance. A high field may represent light with an intensity of 50,000 lux or more down to 5,000 lux, a medium field may represent light with an intensity of 4,999 lux down to 500 lux, and a low field may represent light with an intensity of 499 lux down to 0 lux. Alternately, a high field may represent light with an intensity of 50,000 lux or more down to 15,000 lux, a low-high field may represent light of an intensity of 14,999 lux down to 5,000 lux, a high-medium field may represent light of an intensity of 4,999 lux down to 2,000 lux, a medium field may represent an intensity of 1,999 lux down to 1,000 lux, a low-medium field may represent light of an intensity of 999 lux down to 500 lux, a high-low field may represent light of an intensity of 499 lux down to 100 lux, and a low field may represent an intensity of 99 lux down to 0 lux. CMOS imagers typically register pixel intensity as a digitized voltage (a voltage converted to a digital value). Depending on the sensitivity of the imager, the f number of the lens, or other suitable factor, the digital value of the intensity will vary for different CMOS imagers.

A histogram may be created by the processor integrated circuit by categorizing pixels by fields, in other words, by increasing a counter for each field when light intensity from a pixel is determined to correspond to the field. For example, if the light impinging a pixel, or one or more rows of pixels 420, is determined to have a lux of 25,000, a counter in the high field may be increased by 1. Alternately, if the light impinging a pixel, or one or more rows of pixels 420, is determined to have a lux of 2,000, a counter in the medium field may be increased by 1, or, if the light impinging a pixel, or one or more rows of pixels 420, is determined to have a lux of 50, a counter in the low field may be increased by 1.

A histogram may be based on photocurrents from each pixel, from each row of pixels 420, or may be from fewer than all of the pixels or all of the rows 420. For example, a histogram may be created using every 16th row 420. Another example of using pixels that generate part of an image is to read the intensity, or saturation, for each pixel located at every 16th row 420 and at every 4th column 421. Using less than all the pixels to sample light intensity may provide faster processing while providing adequately accurate light intensity measurements for determining light pulse control (described below). Since the light intensity is digitized in a CMOS imager, the histogram computed by the processor may be a histogram of digital values. For example, when an 8 bit pixel is read, a reading of 0 may represent a low light response (dark) and a reading of 255 may represent the brightest measurable response with the particular settings of the imager. Light intensities brighter than this value will register as the same value (255 in this case). Light intensities brighter than the uppermost digital value is termed saturation. Histograms may be generated that count the number of pixels in the image that correspond to each digitized value (256 different histogram fields in this 8 bit example). Or, a histogram may combine multiple digitized values into the same field to create a more simplified result. For example, if four neighboring digitized values are considered as one histogram field, then a 64 field histogram results when considering 8 bit digitized values instead of a 256 field histogram. Reducing the number of fields in the histogram reduces the amount of memory needed to compute the histogram.

An alternate approach to measuring the intensity of an image for the purpose of determining which type of exposure method to use (described below) is to compute a histogram with very few fields. For example, in a system with an 8 bit pixel depth, the number of pixels that are saturated may be computed, that is, the number of pixels whose value is 255. The number of pixels that are smaller than a target value may also be computed, for example, the number of pixels that are digitized to a value less than 32. With just these two values (the number of pixels whose value is 255 and number of pixels whose value is less than 32) it is possible to determine if the image is too bright or too dark. If relatively many of the pixels, for example one third, are saturated (equal to 255), then the image may be too bright. If relatively many of the pixels, for example, one third, have values less than 32, then the image may be too dark. Information regarding the number of pixels above a predetermined value and/or below a predetermined value may supply sufficient information to determine whether to capture an image using ambient light or using a pulse method for the self generated illumination source as described below.

Figure 5A:
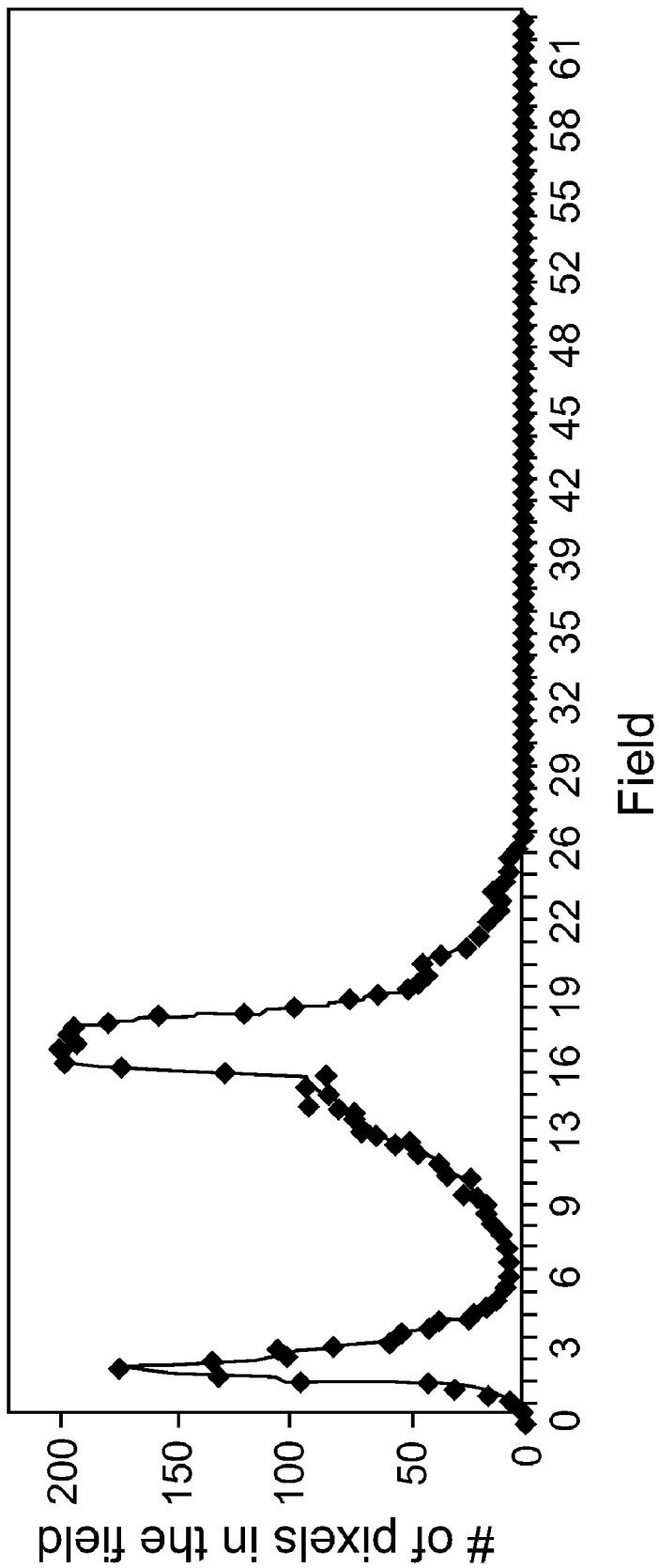
FIG. 5A is a chart of a hypothetical light level histogram.

If a full, or partial, histogram is computed for a frame, the processor integrated circuit 465 may perform statistical analysis on the histogram at step 30 to determine the illuminance of the ambient light. Referring to FIG. 5A, a preferred analysis for analyzing a histogram for the MT9M001 CMOS sensor involves looking at the number of pixels placed in the most saturated field and summing the number of pixels in the most saturated field and each next less saturated field until the summed number equals, or is greater than, 5% of the pixels used to create the histogram. For example, starting with the field 63 (that is, representing the highest pixel saturation for a 64 field histogram), the number of pixels in field 63 is added to the number of pixels in the field 62. The resulting number is then added to the number of pixels in field 61, and so on until the number of summed pixels is equal to, or greater than, 5% of the total number of pixels used to create the histogram. In the hypothetical example illustrated in FIG. 5A, the MT9M001 CMOS 410 has 1,310,720 pixels (1280 rows× 1024 columns) and pixels from every 16th row and every 16th column are used to create the 64 field histogram. Therefore, 5,120 pixels are used to create the histogram.

Once the number of summed pixels equals or exceeds 5% of the total number of pixels used to create the histogram, the ambient light illuminance may be determined to correspond to the lowest histogram field used to arrive at the summed pixels number. In the hypothetical example illustrated in FIG. 5A, 282 pixels were placed into fields 63 through 21. Therefore, the illuminance associated with field 21 is preferably used to determine the ambient illuminance. For example, the fields 63 to 0 may be mapped to lux numbers, or the fields 63 to 0 may be grouped so that each group represents an ambient light level. Alternatively, ambient light illuminance may be expressed in terms of grayscale, or in any other suitable expression.

For another example, if the high, medium, and low fields described above are used, and 55% or more of the photocurrents were categorized in the high field, the processor integrated circuit 465 may determine that the ambient light is high. Alternately, if 55% or more of the photocurrents were categorized in the medium field, the processor integrated circuit 465 may determine that the ambient light is medium, and if 55% or more of the photocurrents were categorized in the low field, the processor integrated circuit 465 may determine that the ambient light is low. Other suitable criteria, statistical or otherwise, may be used to analyze a histogram to determine whether ambient light illuminance is high, medium, low, or falls within another suitable field.

The integrated processor circuit 465 preferably creates a histogram for the illuminance of the ambient light for each frame and may analyze the histogram between frames. The processor integrated circuit 465 may adjust operation of the CMOS 410, the rolling reset shutter, and/or a light source based on determinations of ambient light illuminance as described below.

High Ambient

Referring to FIGS. 4 and 6, operation of a data reader 400, for example, a fixed, presentation, hand held, or other suitable data reader, in high ambient light is illustrated. In FIG. 6, the ambient light 500, that is, light from sources not associated with the data reader 400, is at a high illuminance, or intensity. For example, the ambient light may have an illuminance in the range of 60,000 lux or more. Alternatively, ambient light 500 may be considered to be high when the illuminance of the ambient light 500 is sufficient to permit an integration time for each row of pixels 420 to be in a range of approximately 10 to 1000 microseconds so that the data reader 400 captures an image of a moving target 540 where the image 526, 531, 536 is sufficiently sharp to be decoded by a data decoder and has sufficient contrast with the background to be decoded by a data decoder, for example, as illustrated in FIG. 1 or 1A.

An image may be considered to be sharp and have sufficient contrast with the background when a signal contrast transfer function or other suitable function such as an optical transfer function is performed for each pixel and the signal modulation is 15% or greater for each pixel. Signal modulation may be calculated by subtracting the minimum signal contrast transfer function (representing the darkest pixel) from the maximum signal contrast transfer function (representing the most saturated pixel) and dividing the result by the sum of the maximum and minimum signal contrast transfer functions. The percentage of signal difference that represents sufficient sharpness and contrast for data decoding may vary from data decoder to data decoder. Alternately, it may be beneficial to determine the sharpness of the image (of a barcode, for example) by attempting to process (decode) the image to determine whether the desired information contained in the image can be processed (decoded).

In FIG. 6, time $T_0$ represents the start time, for example, when a triggering device 480 is actuated to activate the CMOS 410 and the electronic rolling shutter. Line 505 represents an integration time, which corresponds to an exposure time, for all of the rows 420. Because there is nothing blocking light from the pixels of the CMOS 410 with a rolling shutter, the integration time and the exposure time are the same. For example, none of the rows 420 are integrating until time 506 when the first row 420 begins integrating. The rows 420 sequentially integrate, and may sequentially stop integrating after a particular row has been exposed for a desired number of row periods (amount of time for each row of pixels to be read out). For example, each row period is approximately 27 microseconds for a sensor with 1280×1024 pixels and a 48 MHz pixel clock. In the highest ambient light conditions, the exposure time may be just one row, or 27 microseconds in this example. At time 507, the last row 420 stops integrating. The time between positions 506 and 507 is the amount of time needed to capture a first image 526 of a moving target 540, in other words, a frame time.

The processor integrated circuit 465 reads the electrical charge of each pixel in the CMOS 410 to capture the image information stored by each pixel. In a CMOS imager with a rolling reset shutter, the read cycle begins with the first row that integrated, and may start anytime after one row period elapses to all of the row periods elapsing. The read cycle preferably progresses through the rows at the same rate the rows are integrated, so each row has the same integration time. The read cycle resets the electrical charges for the pixels in the CMOS 410 to a base charge so the pixels are ready to capture light energy.

Depending on how quickly the target 540 moves through the field of view 545, several frames 525, 530, 535, etc. of the target 540 may be captured between time $T_0$ and time $T_E$. Time $T_E$ represents the end time, for example, when a triggering device is de-actuated to deactivate the CMOS 410 and the electronic rolling shutter. Alternatively, $T_0$ may represent the first frame that contains the target and $T_E$ may represent the last frame that contains the target, for example, in a fixed position data reader that continuously captures frames. For example, FIG. 6 illustrates three frames 525, 530, and 535 capturing an image 526, 531, 536, respectively, of a target 540 moving from right to left and slightly downward through the field of view 545. Target 540 may move with a speed of approximately 100 inches-per-second with respect to the data reader 400, but the speed of target 540 with respect to the data reader 400 may be slower or faster.

Referring to FIG. 7, target 540 is represented as a vertical bar for simplicity, but the target 540 may include machine readable codes, for example, barcodes such as UPC-A and Code 39, two dimensional codes such as PDF417 and DataMatrix, or other suitable codes and/or targets. The time between 506 and 507 represents capturing the first frame 525 where the image 526 of the moving target 540 appears in a first position in the field of view 545. The time between 508 and 509 represents capturing the second frame 530 where the image 531 of the moving target 540 appears in a second position in the field of view 545. And, the time between 510 and 511 represents capturing the third frame 535 where the image 536 of the moving target 540 appears in a third position in the field of view 545.

In each frame 525, 530, 535, the image 526, 531, 536, respectively, is distorted. In other words, the images 526, 531, 536 are not an exact representation of what the target 540 actually looks like. However, for data decoding purposes, data containing targets such as the machine readable codes described above, and other suitable targets, may be successfully decoded even when the image is distorted. For example, by having sharp edges and good contrast from the background, such as illustrated in FIG. 1A, the images 526, 531, 536 may be decoded. Sharp contrast may be determined by dark/saturated signal differences as described above, or by other suitable manner, for example, attempting to decode the image and determining whether the result was successful.

Medium Ambient

Figure 2:
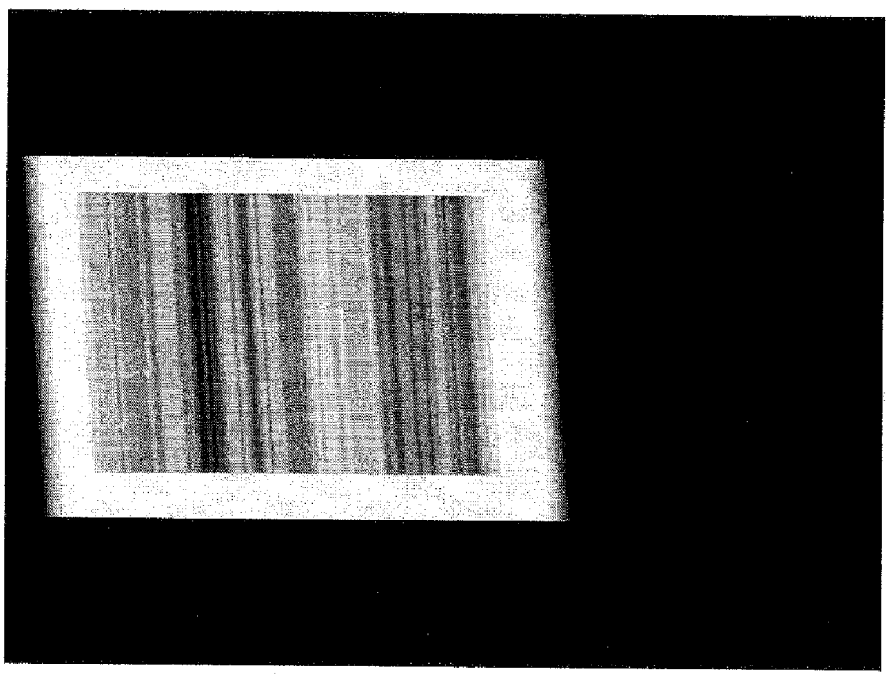
FIG. 2 is an image of the target of FIG. 1A taken with a CMOS with a rolling shutter imager while the target is moving and there is less ambient light than in FIG. 1A.
Figure 8:
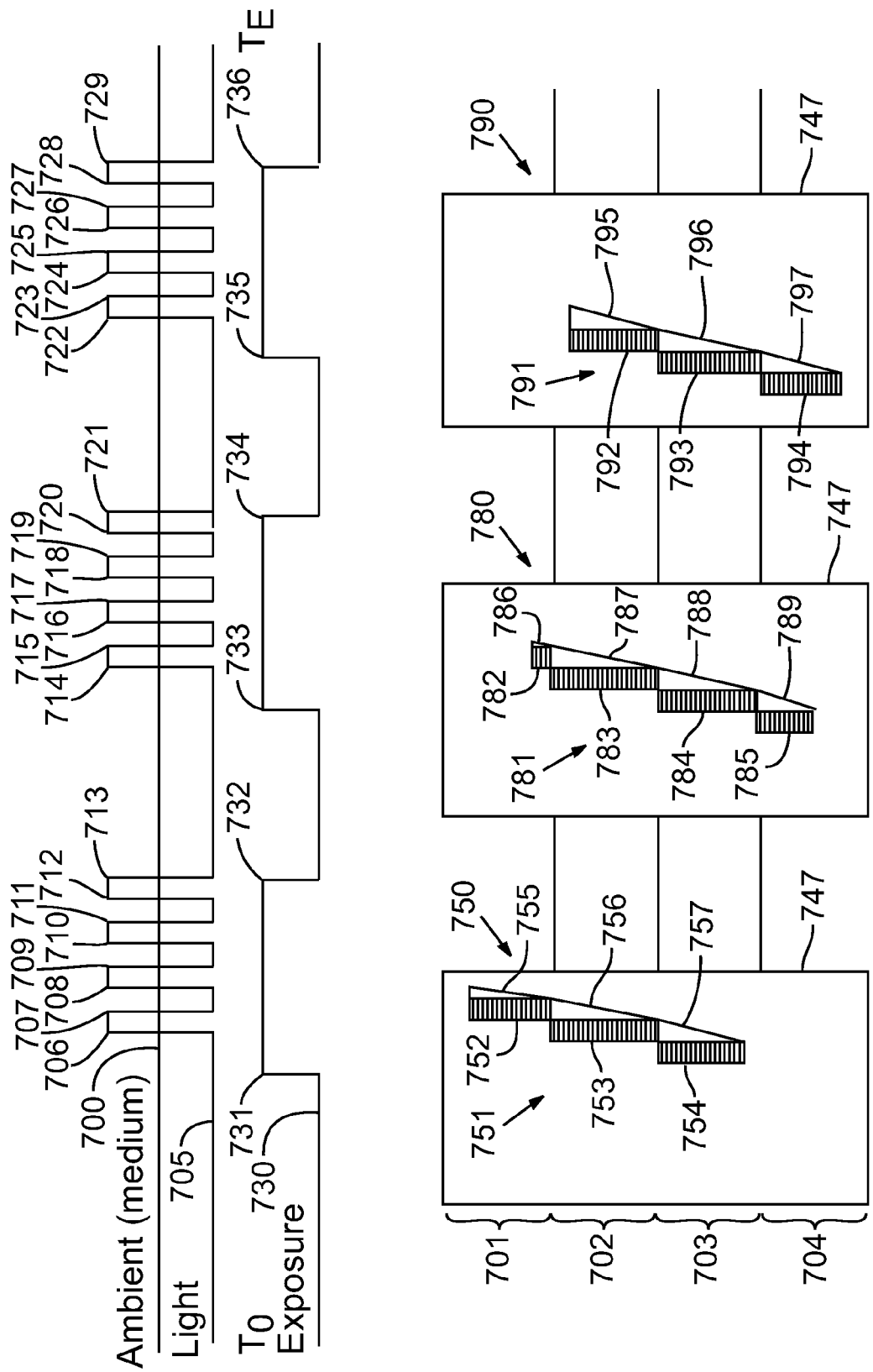
FIG. 8 is a schematic time sequence for capturing multiple images of a moving target.

Referring to FIGS. 4 and 8, operation of a data reader 400 in medium ambient light is illustrated. In FIG. 8, the ambient light 700, that is, light from sources not associated with the data reader 400, is at a medium level. For example, the ambient light may have an illuminance of approximately 10,000 lux, and preferably in the range of 15,000 to 800 lux. Alternately, ambient light 700 may be considered to be medium when the intensity of the ambient light 700 is sufficient to permit an integration time for each row of pixels 420 to be approximately 8.3 milliseconds so that the data reader 400 captures an image of a moving target 540 where the image is blurred when only ambient light is present, for example, as illustrated in FIG. 2. An image may be considered to be blurred when a signal difference, as described above, is 14% or less. Alternately, an image may be considered to be blurred if an attempt to decode information from the image is not successful. Other suitable considerations may be used to determine whether an image is blurred.

In FIG. 8, time $T_0$ represents the start time, for example, when a triggering device 480 is actuated to activate the CMOS 410 and the electronic rolling shutter. Alternately, time $T_0$ may represent when a frame first includes a target. Line 730 represents an integration time, which corresponds to an exposure time, for all of the rows 420. Note that the rows 420 are not all integrating at the same time during the frame time, from 731 to 732. Preferably, a fractional number of rows corresponding to 1 over the number of illumination pulses per frame are integrating during an illumination pulse. For example, when there are four illumination pulses per frame, preferably ¼ of the rows 420 are integrating during each illumination pulse. In the hypothetical example illustrated in FIG. 8, for a frame rate of 30 frames per second, none of the rows 420 are integrating until time 731 when the first row 420 begins integrating. The rows 420 sequentially integrate, and may sequentially stop integrating after a particular row has been exposed for approximately 8.3 milliseconds for a sensor with 1280×1024 pixels and a clock speed of 48 MHz, for example. At time 732, the last row 420 stops integrating. The time between positions 731 and 732 is the amount of time needed to capture a first image 751 of a moving target 540, in other words, a frame time.

Line 705 represents activation of a light source 460, for example, light emitting diodes, halogen bulbs, or other suitable light emitter. The light source 460 may be controlled by the processor integrated circuit 465 to divide each frame 750, 780, 790 into sections 701, 702, 703, and 704, for example. More or fewer sections for each frame may be used. Generally, using more sections may increase the sharpness and background contrast of the image 751, 781, 791 and cause a smaller image shift between sections. Using more sections may also reduce the impact of ambient light on an image by reducing the exposure time for creating the image. In other words, more light pulses may cause the light pulses to override ambient light and be the major illumination source for the captured images. An example is illustrated in FIG. 2A.

By using the light source 460 to divide a frame into sections, an electronic rolling shutter may capture images of a moving target that then may be decoded without requiring a global or mechanical shutter. For example, the CMOS 410 starts integrating at time 731, and between times 731 and 706, captures an image portion 755. Image portion 755 may be blurred because of the integration time for the rows 420 when operating with medium ambient light. However, between times 706 and 707, the light source 460 is activated by the processor integrated circuit 465 and the light reaching the CMOS 410 is temporarily at a high level. Preferably, a light pulse duration is equal to an integer number of clock cycles where one clock cycle is the integration time for one row 420.

Because less than all the rows 420 are integrating during light pulse 706/707, only a portion of the target 540 is captured as the image portion 752. The resulting image portion 752 may have sharp edges and good contrast with the background, as well as not being distorted because of the relatively short duration of the light pulse between times 706 and 707. Preferably, the intensity of the light source 460 creates sufficient contrast between the image portion 752 and the background and between the image portion 752 and the image portion 755 to permit a decoder to decode the image portion 752 in conjunction with the image portions 753 and 754, and images 781 and 791 (described below).

Between times 707 and 708, the CMOS 410 continues integrating and captures an image portion 756. Image portion 756 may be blurred because of the integration time for the rows 420 when operating with medium ambient light. However, between times 708 and 709, the light source 460 is activated by the processor integrated circuit 465 and the light reaching the CMOS 410 is temporarily at a high level. The resulting image portion 753 may have sharp edges and good contrast with the background, as well as not being distorted because of the relatively short duration of the light pulse between times 708 and 709.

Between times 709 and 710, the CMOS 410 continues integrating and captures an image portion 757. Image portion 757 may be blurred because of the integration time for the rows 420 when operating with medium ambient light. However, between times 710 and 711, the light source 460 is activated by the processor integrated circuit 465 and the light reaching the CMOS 410 is temporarily at a high level. The resulting image portion 754 may have sharp edges and good contrast with the background, as well as not being distorted because of the relatively short duration of the light pulse between times 710 and 711.

Because the target 540 does not extend into the section 704, no image portions of the target 540 are captured by the CMOS 410 between times 711 and 732. Referring to frame 780, the same process of capturing blurred image portions and sharp image portions of the target 540 is illustrated. In frame 748, the target 540 extends through all four sections 701-704 resulting in blurred image portions 786, 787, 788, and 789 being captured as well as sharp image portions 782, 783, 784, and 785 being captured. In frame 790, the target 540 extends through sections 702-704, resulting in no image portions in section 701.

For each frame 750, 780, and 790, the processor integrated circuit 465 reads the electrical charge of each pixel in the CMOS 410 to capture the image information stored by each pixel in a manner similar to that described above. The read cycle starts after one or more rows of pixels integrates, and preferably proceeds through the rows at the same rate that integration proceeds through the rows. After each row is read, the electronic rolling shutter resets the electrical charges for the pixels in the CMOS 410 to a base charge so the pixels are ready to capture light energy.

Depending on how quickly the target 540 moves through the field of view 747, several frames 750, 780, 790, etc. of the target 540 may be captured between time $T_0$ and time $T_E$. Time $T_E$ represents the end time, for example, when a triggering device is de-actuated to deactivate the CMOS 410 and the electronic rolling shutter. Alternately, time $T_E$ may represent the last frame in which an image of the target appears. For example, FIG. 8 illustrates three frames 750, 780, and 790 capturing an image 751, 781, 791, respectively, of a target 540 moving from right to left through the field of view 747. Target 540 may move with a speed of 80 inches per second with respect to the data reader 400, and preferably the speed of target 540 with respect to the data reader 400 is in the range of 60 to 120 inches per second.

The time between 731 and 732 represents capturing the first frame 750 where the image 751 of the moving target 540 appears in a first position in the frame 747. The time between 733 and 734 represents capturing the second frame 780 where the image 781 of the moving target 540 appears in a second position in the frame 747. And, the time between 735 and 736 represents capturing the third frame 790 where the image 791 of the moving target 540 appears in a third position in the frame 747.

In each frame 750, 780, 790, the image 751, 781, 791, respectively, has an image shift between sections 701-704. In other words, the images 751, 781, 791 are not an accurate representation of what the target 540 actually looks like because the images 751, 781, 791 have discontinuities where the target 540 does not. However, for data decoding purposes, optical codes, for example, barcodes such as UPC-A and Code 39, two dimensional codes such as PDF417 and DataMatrix, or other suitable codes and/or targets, may be successfully decoded even when the image is shifted. For example, by having sharp edges and good contrast from the background and from the blurred image portions, such as when a dark/saturated signal difference, as described above, is 15% or greater, the image portions 752-754, 782-785, and 792-794 may be stitched and decoded, such as described in U.S. Pat. No. 6,454,168, which is fully incorporated herein by reference. Alternately, a target may be small enough to fit entirely within a section 701, 702, 703, or 704 and may thus be decoded.

Low Ambient

Figure 3:
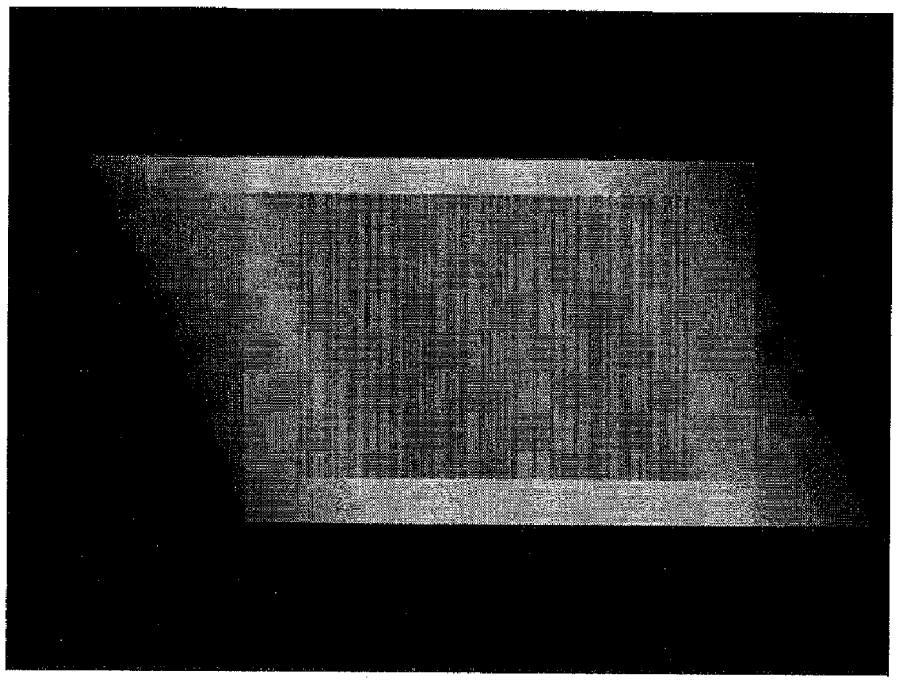
FIG. 3 is an image of a the target of FIG. 1A taken with a CMOS with a rolling shutter imager and pulsed LED illumination with relatively low ambient light while the target is moving.
Figure 2:
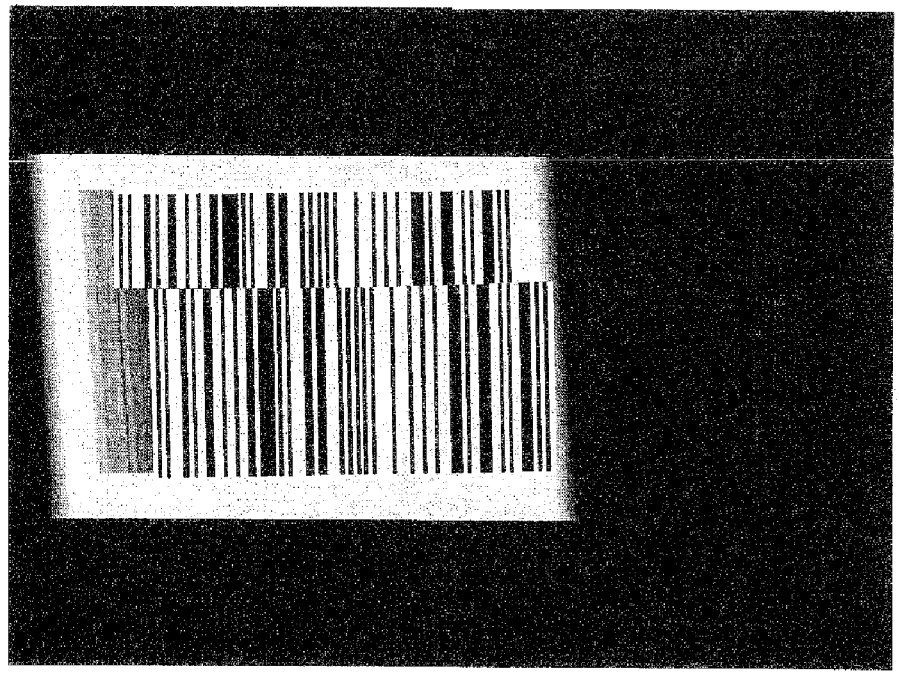
Figure 3:
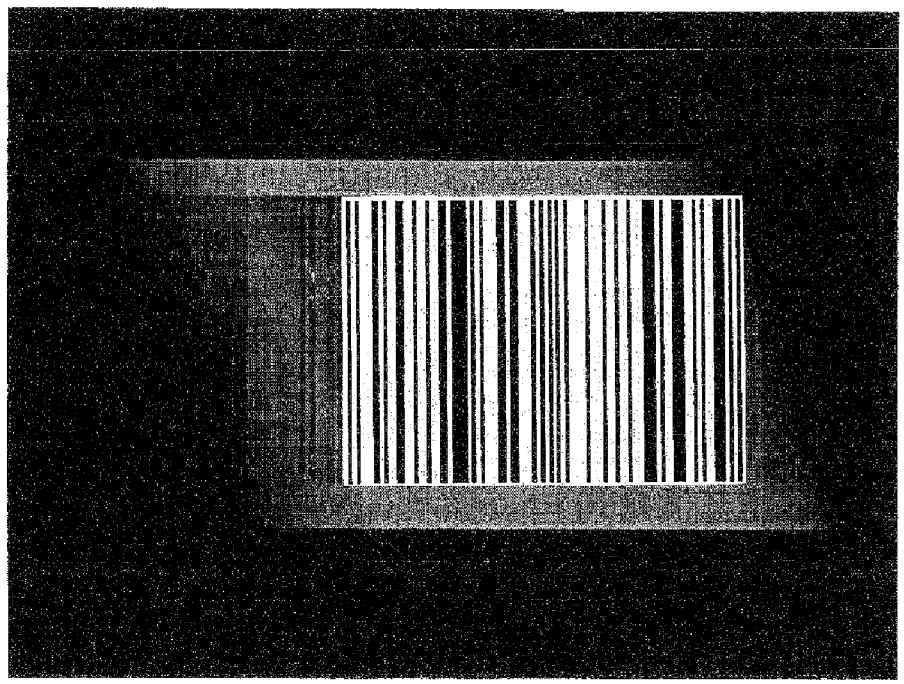
Figure 9:
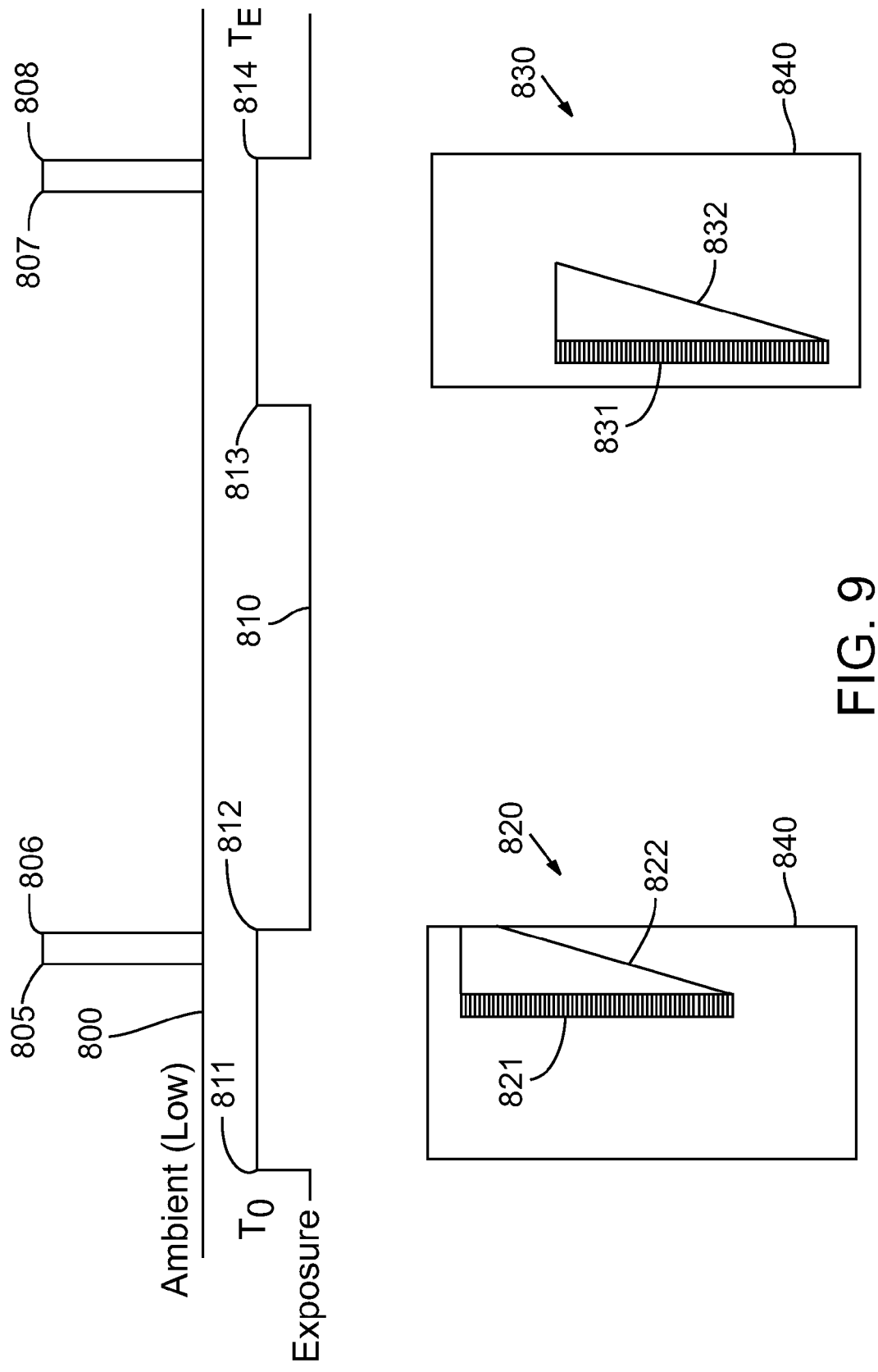
FIG. 9 is a schematic time sequence for capturing multiple images of a moving target.

Referring to FIGS. 4 and 9, operation of a data reader 400, for example, a fixed, presentation, hand held, or other suitable data reader, in low ambient light is illustrated. In FIG. 9, the ambient light 800, that is, light from sources other than the data reader 400, is at a low level. For example, the ambient light may have an illuminance in the range of 500 to 0 lux, and preferably in the range of 100 to 10 lux. Alternately, ambient light 800 may be considered to be low when the intensity of the ambient light 800 is sufficient to cause an integration time for each row of pixels 420 to be in a range of approximately 31 to 32 microseconds so that the data reader 400 captures an image of a moving target 540 where the image is blurred and/or has poor contrast, for example as illustrated in FIGS. 2 and 3.

In FIG. 9, time $T_0$ represents the start time, for example, when a triggering device 480 is actuated to activate the CMOS 410 and the electronic rolling shutter. Line 810 represents an integration time, which corresponds to an exposure time, for all of the rows 420. For example, none of the rows 420 are integrating until time 811 when the first row 420 begins integrating. The rows 420 sequentially integrate, and may sequentially stop integrating after a particular row has been exposed for approximately 32 milliseconds. At time 812, the last row 420 stops integrating. The time between positions 811 and 812 is the amount of time needed to capture a first image 822 of a moving target 540, in other words, a frame time.

Pulses 805/806 and 807/808 represent activation of a light source 460, for example, light emitting diodes, halogen bulbs, or other suitable light emitters. The light source 460 may be controlled by the processor integrated circuit 465 to keep each frame 820, 830 as one section, or may divide each frame 820, 830 into multiple sections (not illustrated). One pulse per frame is preferably used when an imaging device's frame rate is greater than a rate at which humans may notice a flicker. For example, one pulse per frame is preferably used with an imaging device having a frame rate of 60 frames per second or greater.

By using the light source 460 to capture images 821, 831, the imagers may use an electronic rolling shutter to capture images of a moving target 540 that may be decoded without requiring a global or mechanical shutter. For example, the CMOS 410 starts integrating at time 811, and between times 811 and 812, captures an image portion 822. Image portion 822 may be blurred because of the relatively long integration time for the rows 420 when operating with low ambient light. However, between times 805 and 806, the light source 460 is activated by the processor integrated circuit 465 and the light reaching the CMOS 410 is temporarily at a high level. The resulting image portion 821 may have sharp edges and good contrast with the background, as well as not being distorted because of the relatively short duration of the light pulse between times 805 and 806. Preferably, the intensity of the light source 460 creates sufficient contrast between the image portion 821 and the background and between the image portion 821 and the image portion 822 to permit a decoder to decode the image portion 821. An example is illustrated in FIG. 3A.

For each frame, 820 and 830, the processor integrated circuit 465 reads the electrical charge of each pixel in the CMOS 410 to capture the image information stored by each pixel in a manner similar to that described above. The read cycle starts after one or more rows of pixels integrates, and preferably proceeds through the rows at the same rate that integration proceeds through the rows. After each row is read, the electronic rolling shutter resets the electrical charges for the pixels in the CMOS 410 to a base charge so the pixels are ready to capture light energy.

Depending on how quickly the target 540 moves through the field of view 840, several frames 820, 830, etc. of the target 540 may be captured between time $T_O$ and time $T_E$. Time $T_E$ represents the end time, for example, when a triggering device is de-actuated to deactivate the CMOS 410 and the electronic rolling shutter. For example, FIG. 9 illustrates two frames 820 and 830 capturing an image 821 and 831, respectively, of a target 540 moving from right to left through the field of view 840. Target 540 may preferably move with a speed in the range of 60 to 120 inches per second with respect to the data reader 400.

The time between 811 and 812 represents capturing the first frame 820 where the image 821 of the moving target 540 appears in a first position in the frame 840. The time between 813 and 814 represents capturing the second frame 830 where the image 831 of the moving target 540 appears in a second position in the frame 840.

In each frame 820, 830, the images 821, 831 are an accurate representation of what the target 540 actually looks like because of the short duration of the light pulses 805/806 and 807/808. By having sharp edges and good contrast from the background and from the blurred image portions, for example, as described above, the images 821 and 831 may be decoded.

Adjusting Operational Settings

The processor integrated circuit 465 may adjust operation of the data reader 400 depending on the level of ambient light, the relative illuminance contributed by a light source 460, or other suitable determination made using histograms. For example, the processor integrated circuit 465 may cause the data reader 400 to operate for the light conditions from the most recent histogram. In such an embodiment, the processor integrated circuit 465 may store the last determined ambient light level in memory 490 and cause the CMOS, electronic rolling shutter, and/or the light source 460 to operate for the last determined ambient light level, for example, as described above. For example, if the data reader 400 has not been used in several hours, and its last use was outside on a sunny day, the CMOS and electronic rolling shutter may operate as illustrated in FIG. 6 and described above when a triggering device 480 is first activated. After the first frame 525, the processor integrated circuit 465 may create and analyze an ambient light level histogram and determine that the ambient light is now low. The processor integrated circuit 465 may switch operation of the CMOS 410, the electronic rolling shutter, and the light source 460 to operate in low ambient light conditions as illustrated in FIG. 9 and described above. For example, the next frame taken by the imager may resemble frame 830 instead of frame 530.

Preferably, a grayscale determination is used to switch between modes. Referring to FIG. 5A, a grayscale may be adjusted to remove the influence of a light source 460 and is preferably created for 8 bit pixels using the highest 6 bits. The grayscale preferably ranges from 0 (darkest) to 63 (lightest). By creating a grayscale using the combined light source 460 and the ambient light, then subtracting the light source 460, the integrated circuit 465 may adjust the mode of operation, that is, the number of pulses per frame and the integration time for each row, based on the influence the light source 460 has on overall image illumination.

For example, a data reader 400 may initially pulse the light source 460 two times per frame when the data reader has not been used for a predetermined amount of time, for example 15 minutes. The frame with two pulses from the light source 460 may result in a histogram similar to the one depicted in FIG. 5A, but with 5% of the sampled pixels in fields 63 through 45. The next frame may have the light source 460 pulsed three times, and still result in a histogram similar to the one depicted in FIG. 5A, but with 5% of the sampled pixels in fields 63 through 45. The third frame may have the light source 460 pulsed four times, and still result in a histogram similar to the one depicted in FIG. 5A, but with 5% of the sampled pixels in fields 63 through 45. Because the histograms for the three frames have increasing luminance from the light source 460, but the histograms remain the same, the integrated circuit 465 may determine that the illuminance contribution from the light source 460 is negligible and may cease pulsing the light source 460 for subsequent frames.

However, if the histogram for the third frame previously described resulted in 5% of the pixels in fields 63 through 48, the integrated circuit 465 may determine that the illuminance contribution from the light source 460 is moderate, and may switch to a mode alternating between one frame with no pulses from light source 460 and the next frame having four pulses from the light source 460.

Alternately, if the histogram for each frame results in 5% of the sampled pixels being in the 18th field, the 25th field, and the 30th field as pulses increase from 2 to 3 to 4 per frame, the integrated circuit 465 may determine that the illuminance contribution from the light source 460 is high, and may switch to a mode alternating between one frame with four pulses from light source 460 and the next frame having five pulses from the light source 460. The points on a grayscale used to trigger switching between pulse modes may depend on many factors, including, but not limited to, the imaged targets, the imaging device used, the intensity of the light source used, electronics and/or software used to decode images, and other suitable factors.

Figure 14:
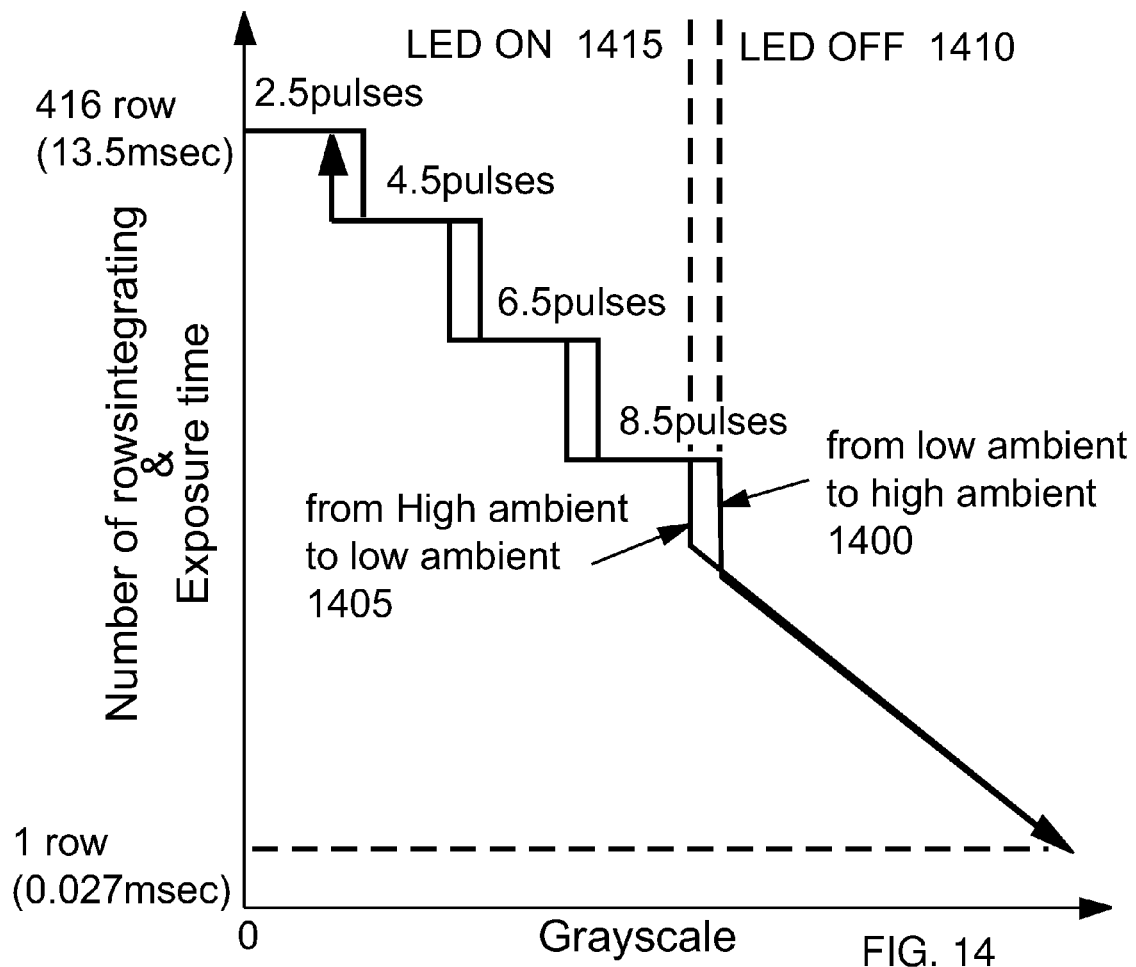
FIG. 14 is a hypothetical graph of where pulse control modes may be switched using a grayscale value from an image.

An exemplary embodiment for switching between modes is illustrated in FIG. 14. In FIG. 14, the processor integrated circuit 465 may switch between different illumination pulse modes differently based on whether ambient light is determined to be decreasing or increasing from a common starting point, such as six and a half pulses per frame. A half pulse per frame indicates alternating between two whole numbers of pulses as frames progress. For example, six and a half pulses per frame may indicate six pulses one frame, followed by seven pulses the next frame, then repeating frames with six and seven pulses, respectively. Line 1400 represents where switching between modes occurs, and line 1410 represents the point at which the light source 460 is turned off, when histogram analysis indicates ambient light is increasing, that the influence from a light source 460 is decreasing, or other suitable histogram analysis. Line 1405 represents where switching between modes occurs, and line 1415 represents the point at which the light source 460 is turned on, when histogram analysis indicates ambient light is decreasing, that the influence from a light source 460 is increasing, or other suitable histogram analysis.

In alternate embodiments, the processor integrated circuit 465 may cause the CMOS 410, electronic rolling shutter, and/or the light source 460 to alternate between operating for two ambient light conditions. For example, if the processor integrated circuit 465 determines that the ambient light level is high, but close to being medium for a first frame, the CMOS and rolling reset shutter may operate as illustrated in FIG. 6 and described above for a second frame, and may operate as illustrated in FIG. 8 and described above for a third frame. Likewise, if the processor integrated circuit 465 determines that the ambient light level is low, but close to being medium for a first frame, the CMOS and rolling reset shutter may operate as illustrated in FIG. 9 and described above for a second frame, and may operate as illustrated in FIG. 8 and described above for a third frame. Alternate embodiments may use more than three fields to categorize ambient light levels, and may also cause the CMOS 410, electronic rolling shutter, and or the light source 460 to alternate between operating for two, or more, ambient light conditions when ambient light conditions are borderline between two fields and/or change during operation of the data reader 400.

Image Shifts

Another preferred configuration pulses a light source more than once per frame. If the lighting system will be visible to human operators, it is desirable for the LED pulse frequency to be at least 60 Hz to avoid irritating flickering of the illumination source as seen by human observers. The present inventors have realized that avoiding flicker with current CMOS imagers may require the frame rate of the CMOS imager to be at least 60 Hz. However, it may not be practical to operate a CMOS imager at a frame rate of 60 Hz or higher due to limitations in the clocking speed of the imager or due to the image capturing circuitry in the image processor. The present inventors realized it may be desirable to pulse the LEDs multiple times per frame to increase the LED pulse frequency to a frequency level to avoid flickering. Preferably, the light source is pulsed while a number of rows are integrating, and the number of integrating rows is less than the total number of rows in the CMOS.

The result of dividing the total number of rows of readout in the CMOS imager by the number of integrating rows is an integer in some embodiments. The captured image becomes split into sections, where portions of the image were captured with illumination from different LED pulses. Alternately, if the object is not moving, the exposure time may be set in such a fashion as to make any split due to illumination relatively invisible in the captured image. However, if the object is moving, the captured image will have distinctive sections, since each portion of the captured image was illuminated by LED pulses that were staggered in time. Alternatively, in other embodiments, the result of dividing the total number of rows of readout in the CMOS imager by the number of integrating rows is not an integer. When the result of dividing the total number of rows in the CMOS by the number of integrating rows is an integer, image frames are divided into the same sections for each frame. On the other hand, when the result of dividing the total number of rows in the CMOS by the number of integrating rows is not an integer, successive image frames are divided into different sections. Dividing successive image frames into different sections may provide benefits when processing images with algorithms that are sensitive to image discontinuities.

Figure 10:
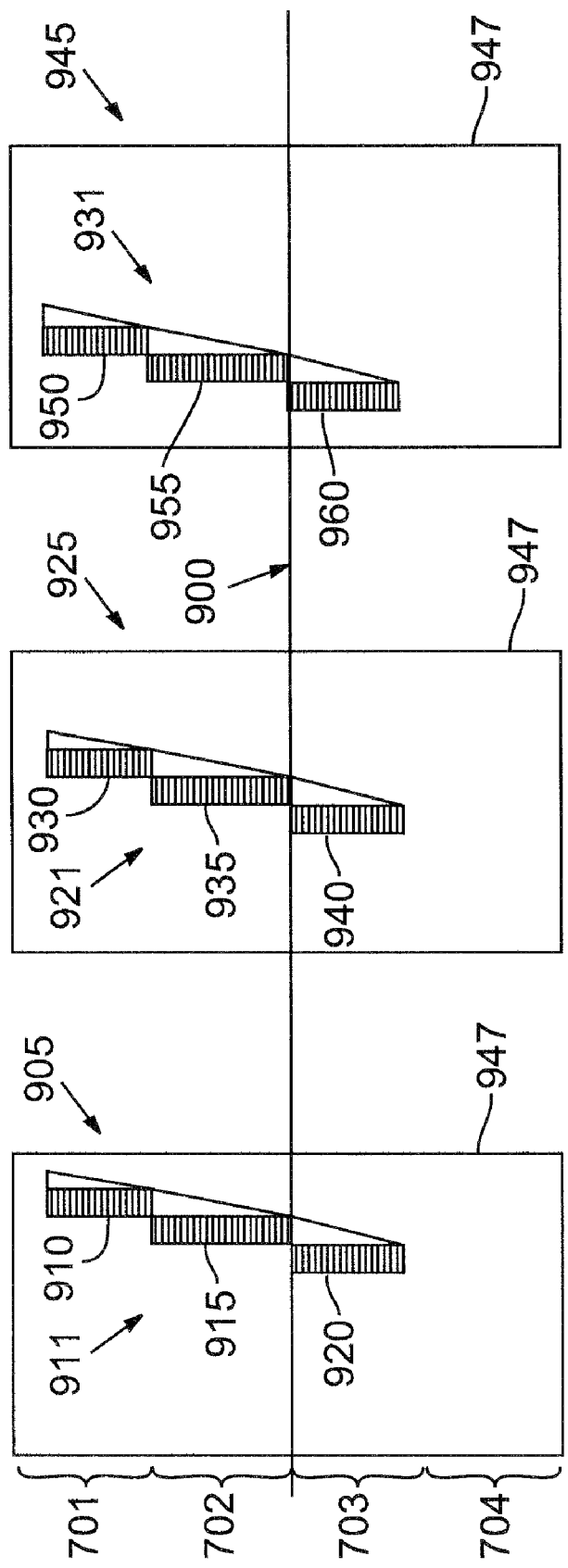
FIG. 10 is a schematic time sequence for capturing multiple images of a moving target where the moving target remains an equal distance from the centerline of a field of view and the field of view is divided into the same sections for each image.

Referring to FIGS. 8 and 10, especially for 2D codes or other suitably complex targets, a potential disadvantage with consistently dividing the field of view 747 into the same sections 701-704 is illustrated. In FIG. 8, the image portions 752-754, 782-785, and 792-794 may be decoded and stitched if needed (as discussed above) because the images 751, 781, and 791 of the target 540 shift at different places on the target 540 due to the target 540 being in a first, second, and third position for each frame 750, 780, and 790, respectively. In some target decoding applications, it may be important to have image shifts that occur away from the center of the target to permit the target to be decoded.

However, if the first, second, and third positions for the target 540 are equidistant from the centerline 900 of the field of view 747 as illustrated in FIG. 10, the images 911, 921, and 931 shift at the same places on the target 540. When the shifts occur at the same places on the target 540, it may not be possible to decode the images 911, 921, or 931. Additionally, when the image shifts occur at the same places in each frame, there is a possibility of a target being located in each frame such that the image shifts do not permit the target to be decoded, for example, when the image shifts occur near the center of a 2D code (regardless of where the 2D code is located in the field of view). To reduce the likelihood that image shifts for a target may occur at positions that make a target difficult or impossible to decode for each frame, it may be advantageous to have the locations where image shifts occur in a frame move from place to place. Moving where the images shifts occur in each frame may make it possible to have one or more frames that cannot be decoded followed by a frame that can be decoded (see, for example, FIGS. 11A-11C), and/or to have two frames that cannot be decoded individually, although the two frames may be decoded when combined (see, for example, FIGS. 11A and 11B). However, capturing a frame that can be decoded may be preferable, especially when the target includes 2D codes which may be time consuming and difficult to stitch and decode.

One manner for having the shifts occur at different places on the target 540, even if the position of the target 540 remains equidistant from the centerline 900 of a field of view 747, is to shift where the field of view 747 is divided into sections. Shifting where the field of view 747 is divided into sections may permit decoding a target even when the target remains equidistant from the centerline 900. For example, the light source 460 may be illuminated after a number of rows 420 (N) integrate, where the result of dividing the total number of rows 420 (M) by the number of rows 420 N is not an integer.

Figure 11:
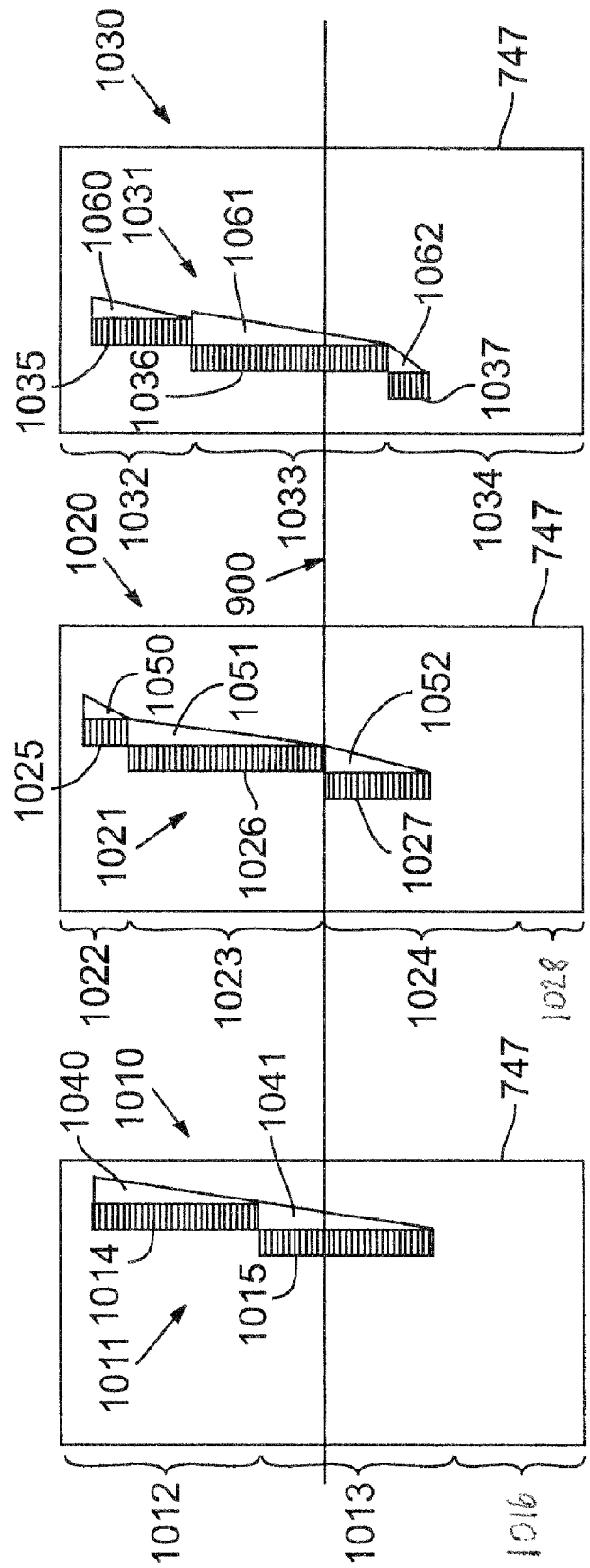
FIG. 11 is a schematic time sequence for capturing multiple images of a moving target where the moving target remains an equal distance from the centerline of a field of view and the field of view is divided into different sections for each image.

As illustrated in FIG. 11, the number of and the positions of the sections shift from frame 1010, 1020, to 1030. For example, frame 1010 may be divided into sections 1012, 1013, and 1016. The target 540 is captured as two non-blurred image portions 1014 and 1015 and two blurred image portions 1040 and 1041. Note that if the target 540 extended into the section 1016 of the field of view 747 for frame 1010, a blurred and a non-blurred image portion would be captured there as well. Because the number of rows 420 N used to trigger activating the light source 460 does not divide evenly into the total number of rows 420 M, frame 1020 has different sections 1022, 1023, 1024, and 1028 with sizes and positions that are different from the sections 1012, 1013, and 1016 for frame 1010. In frame 1020, the target 540 is captured as three non-blurred image portions 1025, 1026, and 1027 and three blurred image portions 1050, 1051, and 1052. Thus, shifts in the image 1021 of the target 540 occur at different places than the shifts in the image 1011 of the target 540, even when the target 540 remains equidistant from the centerline 900. Likewise, frame 1030 has different sections 1032, 1033, and 1034 that result in the image 1031 of the target 540 shifting in different places than the images 1011 and 1021.

Because the images 1011, 1021, and 1031 shift in different locations, even if the target 540 remains equidistant from the centerline 900, the images 1011, 1021, and 1031 may be decoded and/or stitched and decoded as described above.

Figure 11A:
FIG. 11A is a diagram of a shifted image of a 2D code.
Figure 11B:
FIG. 11B is a diagram of a second shifted image of the 2D code of FIG. 11A.
Figure 11C:
FIG. 11C is a diagram of an un-shifted image of the 2D code of FIG. 11A.

Another potential advantage of having the images shift in different locations is preventing an image shift from consistently occurring at the same place on a target to be decoded. Referring to FIGS. 11A and 11B, for example, a 2 dimensional code may be difficult or not possible to decode when an image shift occurs on the target, even when image stitching is used. However, even if an image shift occurs on the target as illustrated in FIGS. 11A and 11B, by moving where in the frame the image shifts occur, the next frame may capture a decodable image of the target, as illustrated in FIG. 11C. Because targets will not necessarily pass though the center of the field of view for a data reader, having the image shifts occur in different locations as described above may increase the likelihood of capturing a decodable image regardless of where in the field of view a target appears.

Multiple Image Sensors

In another preferred construction, a data imager contains multiple CMOS imagers and has multiple light sources. Different CMOS imagers "see" different light sources, in other words, the light from different light sources is detected by different CMOS imagers. The present inventors have realized that current multiple imager applications where the fields of view of the imagers overlap may require the imagers to be synchronized. Synchronizing the imagers may prevent multiple exposures of a moving object from occurring in different locations in the image (referred to as a ghost image). In applications where the field of view of multiple imagers overlap, the present inventors have realized there may be a benefit from synchronizing the pulsed illumination so that the pulses of illumination occur at substantially the same moment. Synchronizing the pulsed illumination may prevent ghost images without synchronizing the imagers. Preferably, relatively synchronized images may be captured by the multiple CMOS imagers without synchronizing the CMOS imagers when the CMOS imagers operate at a relatively similar frame rate and the illumination pulses are synchronized. For example, one CMOS imager may be used as a master so that all of the light sources are pulsed when a number of rows of the master CMOS are integrating.

Figure 12:
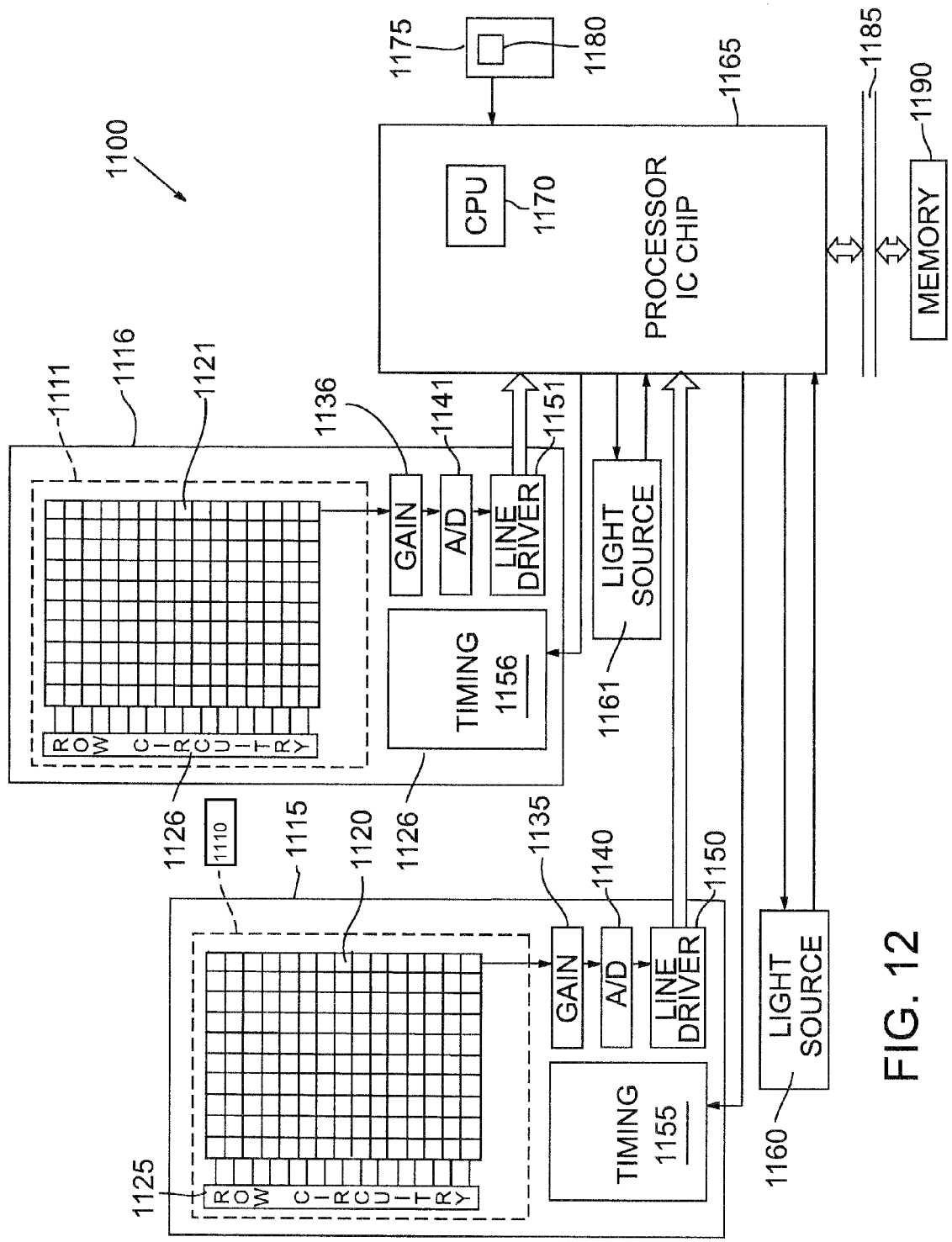
FIG. 12 is a schematic diagram for a data reader with two CMOS imagers.

Referring to FIG. 12, a schematic for an imager 1100 having two CMOS image sensors 1110, 1111 is illustrated. Imager 1100 may be a bioptic imager, for example. CMOS imagers 1110 and 1111 may operate at similar frame rates, for example, but not limited to, the frame rates being within +/−10% of one another. But, the CMOS imagers 1110 and 1111 need not have the same frame rate or be synchronized with one another to produce substantially synchronized images. As with the single CMOS data reader 400 described above, the multiple CMOS imager 1100 may determine ambient light levels and adjust operational parameters for the CMOS imagers 1110 and 1111 based on the last determined ambient light level, or other suitable manner.

According to a preferred embodiment, the light sources 1160 and 1161 may both be controlled by the processor integrated circuit 1165. One CMOS imager, 1110 for example, may be used as a master imager to control when the light sources 1160 and 1161 are pulsed. In other words, both light sources 1160 and 1161 may be pulsed according to ambient light determinations made using CMOS 1110 and when N rows 1120 of the CMOS 1110 are integrating, regardless of how many rows, or what rows, 1121 of the CMOS 1111 are integrating. Therefore, even if the imagers 1110 and 1111 are not synchronized so that they begin integrating and stop integrating at the same time, substantially synchronized images may be obtained. If the CMOS imagers 1110 and 1111 are not synchronized, the shifts in the images produced may occur in different places, but both images may be decoded as described above.

Mechanical Shutter

While preferred embodiments described above may use a CMOS imager with an electronic rolling shutter and light pulse control to create stop-motion images of a moving target, other preferred embodiments may use a mechanical shutter.

Other preferred embodiments preferably use a mechanical shutter in conjunction with a CMOS imager with a rolling shutter or a global reset to capture stop-motion images of a moving target. The mechanical shutter preferably allows the CMOS imager to capture an image during a single LED pulse (while the shutter is open), even when multiple LED pulses per frame occur to prevent human-visible flickering. The mechanical shutter thereby preferably permits an image to be captured when multiple light pulses occur per frame, but without multiple light pulses affecting the captured image.

The mechanical shutter preferably includes a flexible member attached to a shutter that blocks light from impinging a CMOS imager or other suitable image sensor. The shutter is preferably attached to a bobbin that has an electrically conductive material wound around a spool portion of the bobbin, where the spool portion faces away from the shutter. The spool portion of the bobbin is preferably proximate one or more permanent magnets. When an electric current runs through the electrically conductive material wound around the spool, a magnetic field is created and interacts with the magnetic field from the one or more permanent magnets to move the shutter to a position that allows light to impinge a CMOS imager or other suitable image sensor.

Figure 13:
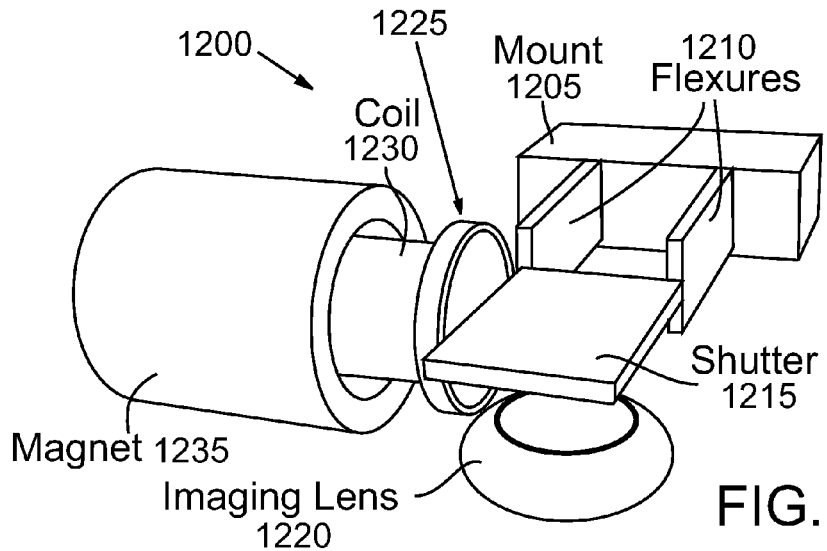
FIG. 13 is a schematic diagram for a mechanical shutter.

Referring to FIG. 13, a schematic for a mechanical shutter 1200 designed for rapid and frequent movement is illustrated. A mount 1205, preferably made from a rigid material, may secure one or more flexible members 1210. Flexible members 1210 may be cantilever beams and may have a rectangular shape, triangular, or other shape suitable for supporting a shutter 1215. Flexible members 1210 may be made from a flexible material such as nylon, or other suitable material. Flexible members 1210 may be attached to the mount 1205 by adhesive, or other suitable attachment.

An opaque shutter 1215 may be attached to the one or more flexible members 1210, preferably by adhesive, or other suitable attachment. The opaque shutter 1215 may be made from a material that blocks substantially all electromagnetic radiation, or selectively permits electromagnetic radiation to pass. The shutter 1215 is preferably placed so that the shutter 1215 blocks light from reaching lens 1220, and thus a CMOS, or other, imager (not shown). The shutter 1215 may be attached to an end of bobbin 1225, which has a coil 1230 of conductive material, preferably aluminum, copper, or a combination of aluminum and copper wire wound about it. The bobbin 1225 is preferably made from a non-electrically conducting material such as plastic. The end of the bobbin 1225 that is opposite the shutter 1215 is preferably surrounded by, or otherwise proximate to, a permanent magnet 1235.

When an electric current flows through the coil 1230, a magnetic field is generated. The generated magnetic field interacts with the magnetic field of the permanent magnet 1235, thus pulling the bobbin 1225 further towards the permanent magnet 1235. The flexible members 1210 are preferably designed to flex sufficiently, for example, 0.30 inch, to permit the shutter 1215 to be moved far enough to permit light to pass through the lens 1220 and thus to a CMOS, or other suitable imager.

Preferably, a CMOS imager is used to determine ambient light intensity as described above. The exposure time for the CMOS may be determined based on the ambient light intensity. The frame rate may then be determined based on how much time is required to have all of the rows integrating during the same time period and may also be based on the exposure time to capture an image. Preferably, an electric current is applied to the coil 1230 at a rate equal to the frame rate for the ambient lighting condition, and the electric current is applied long enough to achieve the exposure time.

In an alternate embodiment, the mechanical shutter may be designed to have a resonant frequency that corresponds to the frame rate. Preferably, the resonant frequency corresponds to a frame rate that is most often used with an imager. In alternate embodiments, the mechanical shutter may be designed with a resonant frequency corresponding to one frame rate and with normal mode frequencies that correspond to other frame rates.

Alternatively, a mechanical shutter as described above may be used in conjunction with a light pulsing configuration as described above. The opaque shutter 1215 may be opaque to a wide range of electromagnetic radiation, or may be selectively opaque to permit some electromagnetic radiation to pass through the opaque shutter 1215, such as infrared radiation, for example.

It will be obvious to those having skill in the art that many changes may be made to the details of the above-described embodiments without departing from the underlying principles of the invention. The scope of the present invention should, therefore, be determined only by the following claims.

The invention claimed is:

1. A data reader comprising:
an image sensor including a complimentary metal oxide semiconductor (CMOS), wherein the CMOS includes a total number (M) of rows of sensor pixels;
an electronic rolling shutter (ERS) for sequentially integrating each row of sensor pixels and for resetting electrical charges and reading electrical charges for each row of sensor pixels to capture decodable images of a target;
a light source for generating pulses of light; and
a processor operatively connected to and controlling the CMOS, the ERS, and the light source to: (1) capture a first image of the target, (2) create a light level histogram from the first image of the target, (3) determine an ambient light intensity based on the light level histogram, and (4) based on the ambient light intensity, coordinate an integration time for each row of sensor pixels with the pulses of light to capture a second image of the target.

2. A data reader according to claim 1, wherein the light level histogram is based on image data from less than the total number (M) of rows of sensor pixels.

3. A data reader according to claim 1, wherein the first image is captured using a number of rows (N) that is less than the total number (M) of rows of sensor pixels and wherein the light level histogram is based on image data from less than all of the rows (N).

4. A data reader according to claim 1, wherein the processor further determines whether the ambient light intensity is high, medium, or low based on the light level histogram; and
(1) when the processor determines that ambient light is high, (i) cause the ERS to have a relatively short elapsed time between resetting a row and reading a row, and (ii) cause the rows to sequentially integrate such that the total number (M) of rows of sensor pixels does not integrate during the same time period;
(2) when the processor determines that ambient light is medium, (i) cause the ERS to have a relatively short elapsed time between resetting a row and reading a row, (ii) cause the rows to sequentially integrate such that the total number (M) of rows of sensor pixels does not integrate during the same time period, and (iii) pulse the light source at a rate corresponding to a number of rows (N) that integrate during the same time period; and
(3) when the processor determines that ambient light is low, (i) cause the ERS to have a relatively long elapsed time between resetting a row and reading a row, (ii) cause the rows to sequentially integrate such that the total number (M) of rows of sensor pixels integrates during the same time period, and (iii) pulse the light source once when all the rows are integrating.

5. A data reader according to claim 4, wherein the processor further determines whether ambient light is low-high, high-medium, low-medium, or high-low; and when the processor determines that ambient light is low-high:
(1) for a first image, (i) cause the ERS to have a relatively short elapsed time between resetting a row and reading a row, and (ii) cause the rows to sequentially integrate such that the total number (M) of rows of sensor pixels does not integrate during the same time period; and
(2) for a second image, (i) cause the ERS to have a relatively short elapsed time between resetting a row and reading a row, (ii) cause the rows to sequentially integrate such that the total number (M) of rows of sensor pixels does not integrate during the same time period, and (iii) pulse the light source at a repetition rate corresponding to a number of rows (N) that integrate during the same time period.

6. A data reader according to claim 5, wherein when the processor determines that ambient light is high-medium:
(1) for a first image, (i) cause the ERS to have a relatively short elapsed time between resetting a row and reading a row, (ii) cause the rows to sequentially integrate such that the total number (M) of rows of sensor pixels does not integrate during the same time period, and (iii) pulse the light source at a repetition rate corresponding to a number of rows (N) that integrate during the same time period; and
(2) for a second image, (i) cause the ERS to have a relatively short elapsed time between resetting a row and reading a row, and (ii) cause the rows to sequentially integrate such that the total number (M) of rows of sensor pixels does not integrate during the same time period.

7. A data reader according to claim 5, wherein when the processor determines that ambient light is medium-low:
(1) for a first image, (i) cause the ERS to have a relatively short elapsed time between resetting a row and reading a row, (ii) cause the rows to sequentially integrate such that the total number (M) of rows of sensor pixels does not integrate during the same time period, and (iii) pulse the light source at a repetition rate corresponding to a number of rows (N) that integrate during the same time period; and
(2) for a second image, (i) cause the ERS to have a relatively long elapsed time between resetting a row and reading a row, (ii) cause the rows to sequentially integrate such that the total number (M) of rows of sensor pixels integrates during the same time period, and (iii) pulse the light source once when all the rows are integrating.

8. A data reader according to claim 5, wherein when the processor determines that ambient light is low-high:
(1) for a first image, (i) cause the ERS to have a relatively long elapsed time between resetting a row and reading a row, (ii) cause the rows to sequentially integrate such that the total number (M) of rows of sensor pixels integrates during the same time period, and (iii) pulse the light source once when all the rows are integrating; and
(2) for a second image, (i) cause the ERS to have a relatively short elapsed time between resetting a row and reading a row, (ii) cause the rows to sequentially integrate such that the total number (M) of rows of sensor pixels does not integrate during the same time period, and (iii) pulse the light source at a repetition rate corresponding to a number of rows (N) that integrate during the same time period.

9. A data reader according to claim 4, where the result of dividing (M) by (N) is not a whole number.

10. A data reader according to claim 1, further comprising:
a second image sensor including a second complimentary metal oxide semiconductor (CMOS2), wherein the CMOS2 includes rows of sensor pixels that sequentially integrate to capture an image;
a second electronic rolling shutter (ERS2) for sequentially integrating each row of sensor pixels of the CMOS2 and for resetting electrical charges and reading electrical charges for each row of sensor pixels of the CMOS2; and
a second light source;
wherein the processor is operatively connected to and controls the CMOS2, the ERS2, and the second light source to coordinate an integration time for each row of sensor pixels for the CMOS2 with pulses of light from the second light source to capture decodable images of a moving target based on the ambient light intensity.

11. A data reader according to claim 10, wherein the processor further determines whether the ambient light intensity is high, medium, or low based on the histogram; and
when the processor determines that ambient light is high, (1) cause the ERS and the ERS2 to have a relatively short elapsed time between resetting a row and reading a row, and (2) cause the rows for both the CMOS and the CMOS2 to sequentially integrate such that the total number (M) of rows of sensor pixels does not integrate within the same time period;
when the processor determines that ambient light is medium, (1) cause the ERS and the ERS2 to have a relatively short elapsed time between resetting a row and reading a row, (2) cause the rows for both the CMOS and the CMOS2 to sequentially integrate such that the total number (M) of rows of sensor pixels for the CMOS does not integrate within the same time period and such that all the rows for the CMOS2 do not integrate within the same time period, and (3) pulse the light source and the second light source at a rate corresponding to a number of rows (N) of the CMOS that integrate during the same time period; and
when the processor determines that ambient light is low, (1) cause the ERS and the ERS2 to have a relatively long elapsed time between resetting a row and reading a row, (2) cause the rows for both the CMOS and the CMOS2 to sequentially integrate such that the total number (M) of rows of sensor pixels for the CMOS integrate during the same time period and such that all the rows for the CMOS2 integrate during the same time period, and (3) pulse the light source once when the total number (M) of rows of sensor pixels of the CMOS is integrating.

12. A method of operating a data reader comprising the steps of:
acquiring an image with an image sensor, wherein the image sensor includes a complimentary metal oxide semiconductor (CMOS) having a total number (M) of rows of sensor pixels;
via an electronic rolling shutter (ERS), (a) sequentially integrating each row of sensor pixels of the CMOS, (b) reading electrical charges for each row of sensor pixels, and (c) resetting electrical charges for each row of sensor pixels;
generating pulses of light from a light source toward a target; and
via a processor operatively connected to the CMOS, the ERS, and the light source, controlling the CMOS, the ERS, and the light source to pulse the light source each time a number of rows (N) integrate, where the number of rows (N) is less than the total number of rows (M) and the result of dividing (M) by (N) is not a whole number.

13. A data reader comprising:
a first imager including a first complimentary metal oxide semiconductor (CMOS1), wherein the CMOS1 includes rows of first sensor pixels that sequentially integrate to capture a first decodable image of a target and a total number of rows (M) of first sensor pixels;
a first electronic rolling shutter (ERS1) for sequentially integrating each row of first sensor pixels of the CMOS1 and for resetting electrical charges and reading electrical charges for each row of first sensor pixels of CMOS1;
a first light source for generating pulses of light;
a second imager including a second complimentary metal oxide semiconductor (CMOS2), wherein the CMOS2 includes rows of second sensor pixels that sequentially integrate to capture a second decodable image of the target;
a second electronic rolling shutter (ERS2) for sequentially integrating each row of second sensor pixels of the CMOS2 and for resetting electrical charges and reading electrical charges for each row of second sensor pixels of CMOS2;
a second light source for generating pulses of light; and
a processor operatively connected to and controlling the CMOS1, the ERS1, the first light source, the CMOS2, the ERS2, and the second light source to pulse the first light source and the second light source each time a number of rows (N) of CMOS1 integrate.

14. A data reader according to claim 13, wherein the number of rows (N) that integrate during the same time period for CMOS1 is less than the total number of rows (M) for CMOS1.

15. A data reader according to claim 14, wherein the result of dividing (M) by (N) is not a whole number.

16. A method for capturing an image of a moving target with a data reading system that includes a light source and an imager operating on a rolling basis, comprising the steps of:
capturing with the imager a first image of at least a portion of the moving target;
creating a light level histogram based on the first image;
determining an ambient light intensity based on the histogram;
adjusting the rolling basis for the imager based on the determined ambient light intensity; and
pulsing the light source based on the determined ambient light intensity and the adjusted rolling basis for the imager.

17. A method according to claim 16, further comprising capturing with the imager a second image of at least a portion of the moving target;
wherein the first image includes an image shift at a first location; and
wherein the second image includes an image shift at a second location and not at the first location.

18. A method according to claim 17, wherein the imager includes a number (M) of rows of sensor pixels, and wherein pulsing the light source occurs each time a number (N) of rows of sensor pixels capture image data wherein the result of dividing (M) by (N) is not a whole number.

19. A method according to claim 16, wherein the data reading system includes a second light source and a second imager that operates on a rolling basis;
wherein the step of adjusting the rolling basis for the imager further includes adjusting the rolling basis for the second imager based on the determined ambient light intensity for the first imager; and
wherein the step of pulsing the light source includes pulsing the second light source based on the determined ambient light intensity for the first imager and the adjusted rolling basis for the first imager.

20. A method according to claim 16, wherein:
determining an ambient light intensity includes determining that an illuminance influence from the light source is negligible;
adjusting the rolling bases for the imager includes setting the imager so that a slanted image of a moving target is captured; and
pulsing the light source includes not pulsing the light source when an image of a target is captured.

21. A method according to claim 16, wherein:
determining an intensity of ambient light includes determining that an illuminance influence from the light source is moderate;
adjusting the rolling bases for the imager includes setting the imager so that a slanted image of a moving target is captured; and
pulsing the light source includes pulsing the light source two or more times when an image of a target is captured.

22. A method according to claim 16, wherein:
determining an intensity of ambient light includes determining that an illuminance influence from the light source is high;
adjusting the rolling bases for the imager includes setting the imager so that a slanted image of a moving target is captured; and
pulsing the light source includes pulsing the light source one or two times when an image of a target is captured.

* * * * *